United States Patent
Hayashi et al.

(10) Patent No.: US 7,149,828 B2
(45) Date of Patent: Dec. 12, 2006

(54) BUS ARBITRATION APPARATUS AND BUS ARBITRATION METHOD

(75) Inventors: Atsushi Hayashi, Kanagawa (JP); Mitsuaki Shiraga, Chiba (JP); Katsuhiko Yamanaka, Tokyo (JP)

(73) Assignee: Sony Corporation (JP)

( * ) Notice: Subject to any disclaimer, the term of this patent is extended or adjusted under 35 U.S.C. 154(b) by 99 days.

(21) Appl. No.: 11/113,970

(22) Filed: Apr. 26, 2005

(65) Prior Publication Data
US 2005/0240707 A1 Oct. 27, 2005

(30) Foreign Application Priority Data
Apr. 27, 2004 (JP) .............................. 2004-131860

(51) Int. Cl.
G06F 13/36 (2006.01)
G06F 13/368 (2006.01)
G06F 13/37 (2006.01)

(52) U.S. Cl. ...................... 710/120; 710/119; 710/121; 710/122; 710/123

(58) Field of Classification Search ................ 710/113, 710/114, 115, 119, 120, 121, 122, 123
See application file for complete search history.

(56) References Cited

U.S. PATENT DOCUMENTS

| 4,257,095 A | * | 3/1981 | Nadir ........................ 710/119 |
| 4,760,515 A | * | 7/1988 | Malmquist et al. ......... 710/121 |
| 5,499,345 A | * | 3/1996 | Watanabe ................... 710/117 |
| 6,961,793 B1 | * | 11/2005 | Kato ........................... 710/113 |
| 2005/0204084 A1 | * | 9/2005 | Joe et al. .................... 710/113 |
| 2006/0212632 A1 | * | 9/2006 | Apostol et al. ............. 710/113 |

FOREIGN PATENT DOCUMENTS

| JP | 06-060017 | 3/1994 |
| JP | 2002-304367 | 10/2002 |

* cited by examiner

*Primary Examiner*—Rehana Perveen
*Assistant Examiner*—Jeremy S. Cerullo
(74) *Attorney, Agent, or Firm*—Rader Fishman & Grauer PLLC; Ronald P. Kananen

(57) ABSTRACT

The present invention is to provide a bus arbitration apparatus and a bus arbitration method not reducing data transfer capability as a whole and preventing a loss of transferred data. It performs the arbitration with priority in response to properties of bus masters. It sequentially arbitrates a first hierarchy bus master of which requests are urgent, a second hierarchy bus master that requests data processing in real time, and a third hierarchy bus master that is neither a first hierarchy bus master nor a second hierarchy bus master sequentially.

9 Claims, 29 Drawing Sheets

23c

23d

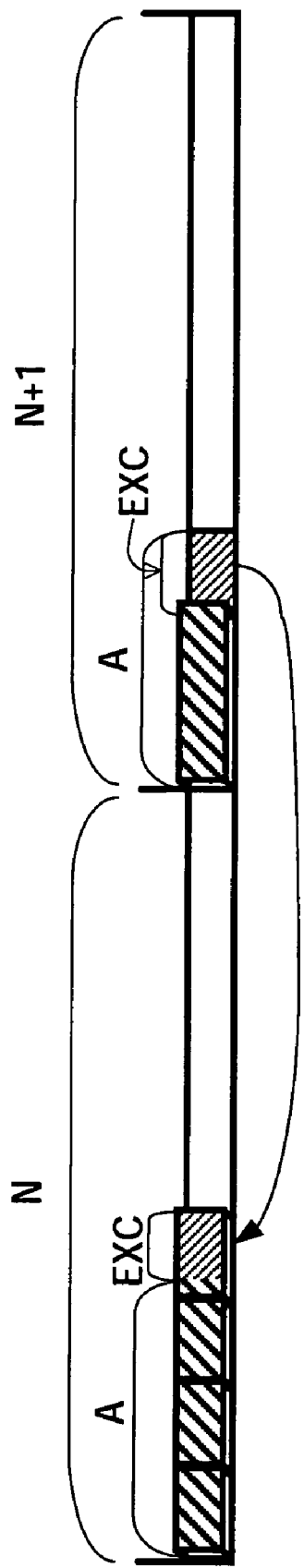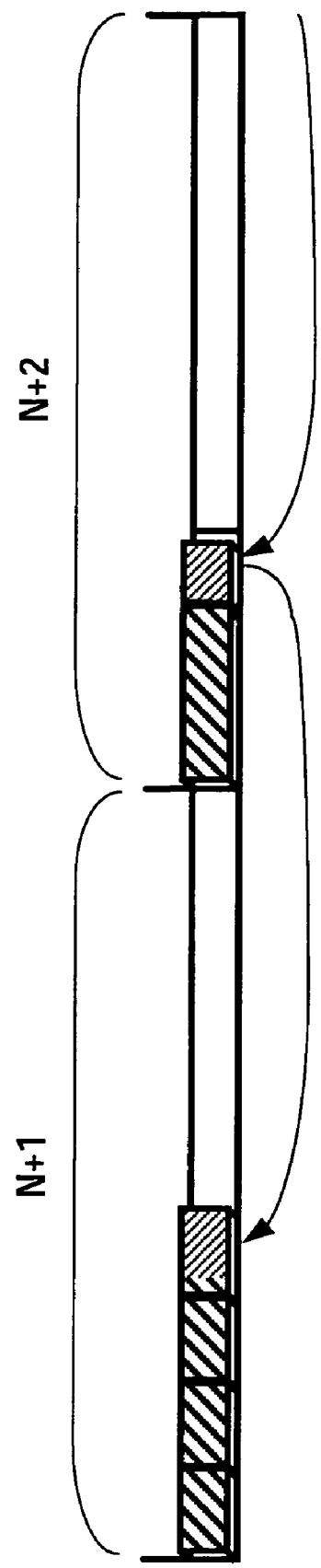

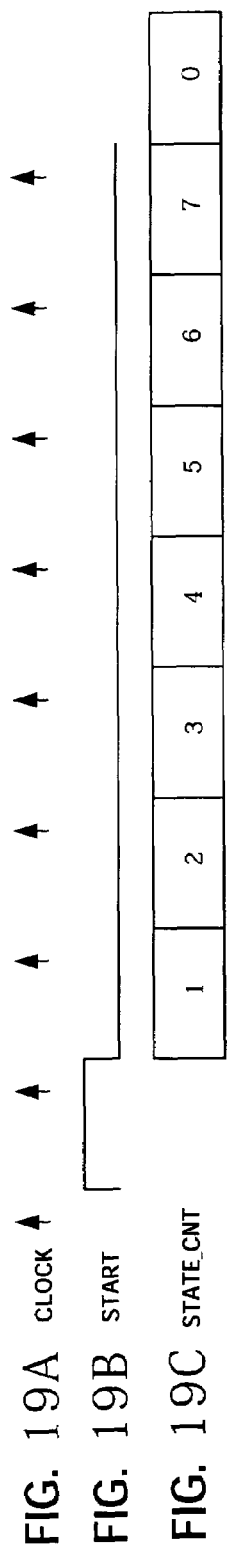
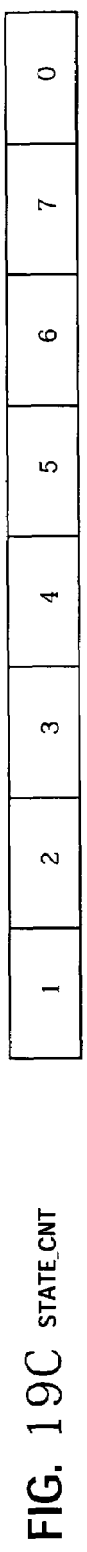
FIG. 19A CLOCK
FIG. 19B START
FIG. 19C STATE_CNT
FIG. 19D
FIG. 19E
FIG. 19F all_res_mask

BUS ARBITRATION APPARATUS AND BUS ARBITRATION METHOD

CROSS REFERENCES TO RELATED APPLICATIONS

The present invention contains subject matter related to Japanese Patent Application JP 2004-131860 filed in the Japanese Patent Office on Apr. 27, 2004, the entire contents of which-being incorporated herein by reference.

BACKGROUND OF THE INVENTION

1. Field of the Invention

The present invention relates to a bus arbitration apparatus and a bus arbitration method and in particular, relates to a bus arbitration apparatus and a bus arbitration method accessing directly to a memory connected on a system bus and enabling to use the system bus.

2. Description of the Related Art

A technology has been known from the past, relating to a bus arbitration apparatus configured so that a fluctuation of data transfer timing and a fluctuation of arbitration waiting time is absorbed by a FIFO (First In First Out) buffer, and a difference of the amount of the data transfer of each bus master and a difference of information related to the data transfer and so on are reflected to the arbitration, thereby preventing FIFO buffer from overflow/underflow.

For example, a bus arbitration apparatus is known which decides the priority of bus use in the order of sending a request of the bus use (data transfer request) to prevent the processing of each bus master from failing.

For example, Kokai (Japanese unexamined patent publication) No. H6(1994)-60017 proposes an arbitration circuit which gives an urgent bus acquisition signal in exceeding a predetermined time limit when during one bus master performs the data transfer the other bus master requests the data transfer, or an arbitration circuit which counts the cycle number that the bus master requests to decide the priority in order of requesting, as a bus arbitration apparatus suppressing overflow/underflow of the FIFO buffer.

As a result, a data transfer grant is given to the bus master requesting the data transfer later, and the FIFO buffer of the bus master does not fall into the overflow/underflow.

Kokai (Japanese unexamined patent publication) No. 2002-304367 proposes a round robin type arbiter having a tree structure for preventing of processing speed reduction even if number of bus master increases when arbitrating the requests of a plurality of bus masters.

According to a technology proposed in Kokai (Japanese unexamined patent publication) No. H6(1994)-60017, it becomes possible to improve the processing capability of the bus arbitration apparatus and to cut the FIFO buffer capacity that should be provided in each bus master, however, it may be not possible to judge whether or not the system fails.

For example, an arbitration circuit proposed in Kokai (Japanese unexamined patent publication) No. H6(1994)-60017 is configured so that an urgent bus acquisition signal is sent when exceeding a predetermined time limit and a data transfer grant is given in response to that, however, even if this urgent path is provided, when a plurality of bus masters exceed this time limit, it may be not possible to secure that the FIFO buffer falls into the overflow/underflow.

Further, even if the FIFO buffers of two or three bus masters are made not to fall into the overflow and so on at the same time by relaxing the time limit and giving the urgent bus acquisition signal, in consideration of increase of number of bus master due to becoming large of system in one chip and diversification of system modes in one chip in the recent years, more than two or three bus masters may fall into the overflow and so on at the same time.

When relaxing the time limit further, the urgent bus acquisition signal is generated more easily, as a result, the arbitration based on the urgent bus acquisition signal may be performed among all the bus masters. In this case, there may be no point in providing the urgent bus acquisition signal.

SUMMARY OF THE INVENTION

It is desirable to provide a bus arbitration apparatus and a bus arbitration method not reducing the data transfer capability as the whole and preventing a loss of transferred data.

A bus arbitration apparatus of the present invention is a bus arbitration apparatus arbitrating data transfer requests for a bus from a plurality of bus masters, having a first arbitration unit for arbitrating data transfer requests of a plurality of first bus masters, among the plurality of the bus masters, which request an assurance of delay time from the data transfer request until the data transfer starts, a second arbitration unit for arbitrating data transfer requests of a plurality of second bus masters, among the plurality of the bus masters, which perform a data transfer every predictable data transfer period, and a third arbitration unit for arbitrating data transfer requests of a plurality of third bus masters, among a plurality of the bus masters, which are not either the first bus masters or the second bus masters, wherein arbitrations are performed by the first to the third arbitration unit sequentially.

In the bus arbitration apparatus of the present invention, first, the first arbitration unit arbitrates data transfer requests of a plurality of first bus masters, among the plurality of the bus masters, which request an assurance of delay time from the data transfer request until the data transfer starts. Then, a second arbitration unit arbitrates data transfer requests of a plurality of second bus masters, among a plurality of the bus masters, which perform a data transfer every predictable data transfer period. Further, a third arbitration unit arbitrates data transfer requests of a plurality of third bus masters, among a plurality of the bus masters, which are not either the first bus masters or the second bus masters.

Namely, in the bus arbitration apparatus according to an embodiment of the present invention, since the arbitration of each bus master is not performed uniformly, the hierarchical type arbitration is performed in response to a property of the bus master, it becomes possible not to reduce the data transfer capability as the whole and possible to prevent a loss of transferred data.

In the following explanations of each embodiment, a first embodiment corresponds to the first and the tenth invention, a second corresponds to the second and the third invention, a third embodiment corresponds to the fourth invention, a fourth and a fifth embodiment correspond to the fifth invention, a sixth embodiment corresponds to the sixth invention, a seventh embodiment corresponds to the seventh invention, an eighth embodiment corresponds to the eighth invention and a ninth embodiment corresponds to the ninth invention respectively.

BRIEF DESCRIPTION OF THE DRAWINGS

These and other objects and features of the present invention will become clearer from the following description of the preferred embodiments given with reference to the accompanying drawings, in which:

FIGS. 10A and 10B are views expressing processing for a first hierarchy bus master;

FIGS. 19A to 19F are timing charts showing an operation of a time arbitration circuit;

DESCRIPTION OF THE PREFERRED EMBODIMENTS

Preferred embodiments of the present invention will be described with reference to the accompanying drawings.

<First Embodiment>

Generally, it is often the case that a property of a bus master is greatly different respectively in response to a function of a client.

For example, a certain bus master has a client such as a CPU, accesses unpredictably, and has a property that it is necessary for the urgency extremely or that the capability of an entire system is improved by being performed processing quickly as possible simultaneously.

A certain bus master has a client such as a digital TV and has a property that data transfer time can be predicted and it is necessary to prevent loss of transferred data by the FIFO buffer. For example, about a digital TV, one horizontal line becomes necessary by the vertical scanning time unit for displaying in real time and it is necessary that data transfer for that image data is performed in predicted time.

Further, a certain bus master has a property that the data transfer may be performed for comparative long time, namely, the urgency is low.

In the above case, when security of the same transferred data is performed equally regardless of a property of each bus master, a performance of the entire bus is reduced greatly. In particular, it is desirable to arbitrate between a bus master having a property of performing an unpredicted access is performed and data transfer requiring the urgency extremely and a bus master having a property that its transfer time can be predicted and a loss of transferred data is prevented by the FIFO buffer, and to avoid a loss of the transferred data without decreasing the entire system performance in a bus arbitration apparatus according to an embodiment of the present invention.

Figure 1:
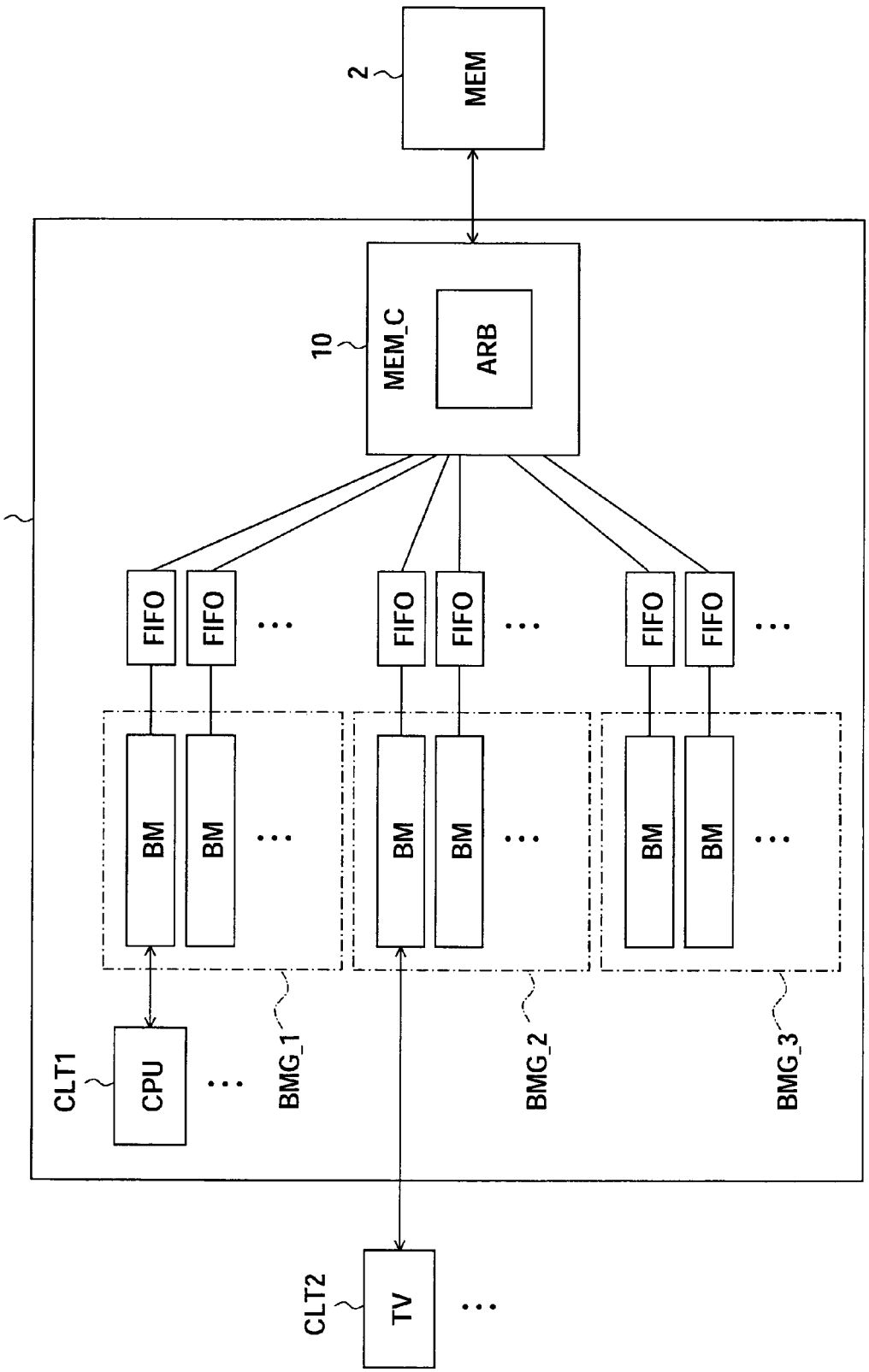
FIG. 1 is a view showing a system configuration that a bus arbitration apparatus related to an embodiment is applied.

FIG. 1 shows a general system configuration to which a bus arbitration apparatus according to an embodiment of the present invention is applied.

In FIG. 1, a CPU and a TV (in particular digital TV) are clients (a client CLT1 and CLT2 respectively) and it requests the data transfer for a corresponding bus master.

A data processing apparatus 1 is a data processing apparatus for processing to satisfy a data transfer request from a plurality of clients, formed by one chip LSI.

A memory MEM has, for example, a DDR memory as a SDRAM having a fast data transfer function by a double data mode. The memory MEM stores data corresponding to each client and read/write processing of data related to a request of the bus master arbitrated by the data processing apparatus is performed.

The data processing apparatus 1 has a plurality of bus masters receiving data transfer requests from each client as shown in a view. Each bus master performs a data transfer request (request of access privileges for a memory bus) for a memory controller (MEM_C) 10 based on a data transfer request from a corresponding client.

Further, an FIFO buffer provided in each bus master stores data related to the read/write processing temporarily.

An arbiter (ARB) included in the memory controller (MEM_C) 10 corresponds to a bus arbitration apparatus according to an embodiment of the present invention.

The arbiter (ARB) monitors the amount of data of each FIFO buffer so that the data transfer does not catch up and the FIFO buffer fails, arbitrates the data transfer request (REQ) from each bus master and gives data transfer grant (GNT).

The arbiter according to the present embodiment classifies all bus masters from a point of view of a property of a bus master depending on the client and processes as mentioned above.

A first hierarchy bus master BMG_1 classified by the arbiter has, for example as shown in FIG. 1, has a plurality of bus masters having a client such as a CPU, accessing unpredictably, and being necessary for the urgency extremely. Namely, the client of the first hierarchy bus master BMG_1 has necessity to secure latency that the data transfer grant (GNT) should be given at extremely early timing from receiving the data transfer request (REQ).

Hereinafter, the client corresponding to the first hierarchy bus master BMG_1 is called as a first hierarchy client. Further, as shown in FIG. 1, the first hierarchy bus master BMG_1 may not have the FIFO buffer.

The second hierarchy bus master BMG_2, for example as shown in FIG. 1, has a client able to predict data transfer time such as a digital TV (client CLT2) performing display processing in real time.

Namely, the client of the second hierarchy bus master BMG_2 performs display processing in real time such as the above-mentioned digital TV, and it is a client that by when image data is necessary to be performed read/write processing is clarified preliminary. Since time necessary for data transfer can be predicted, the second hierarchy bus master BMG_2, for example, can perform a read request in the early stage.

Further, in the second hierarchy bus master BMG_2, it is assumed that a loss of the transferred data is prevented by the FIFO buffer. For example, in the case that the arbitration by the arbiter is delayed, the second hierarchy bus master BMG_2 weathers delay of the arbitration by storing data in the FIFO buffer temporarily.

Hereinafter, the client corresponding to the second hierarchy bus master BMG_2 is called as a second hierarchy client.

A third hierarchy bus master BMG_3 has a plurality of bus masters not belonging to any of the first hierarchy bus master BMG_1 or the second hierarchy bus master BMG_2 and has a property that its urgency is low because it is enough to perform data transfer in relatively long time.

Hereinafter, the client corresponding to the third hierarchy bus master BMG_3 is called as a third hierarchy client. Further, as shown in FIG. 1, the third hierarchy bus master BMG_3 may not have the FIFO buffer.

Although the arbiter performs the arbitration between these bus masters, at the time, in principle, the arbitration of the first hierarchy bus master BMG_1 is performed by the top priority.

Then, in the case that the arbitration of first hierarchy bus master BMG_1 is not performed, such as a case that bus use right is not requested in the first hierarchy bus master BMG_1, the second hierarchy bus master BMG_2 is arbitrated. Further, in the case the first hierarchy and the second hierarchy bus master BMG_1 and BMG_2 are not arbitrated, the arbitration of the third hierarchy bus master BMG_3 is performed.

Figure 2:
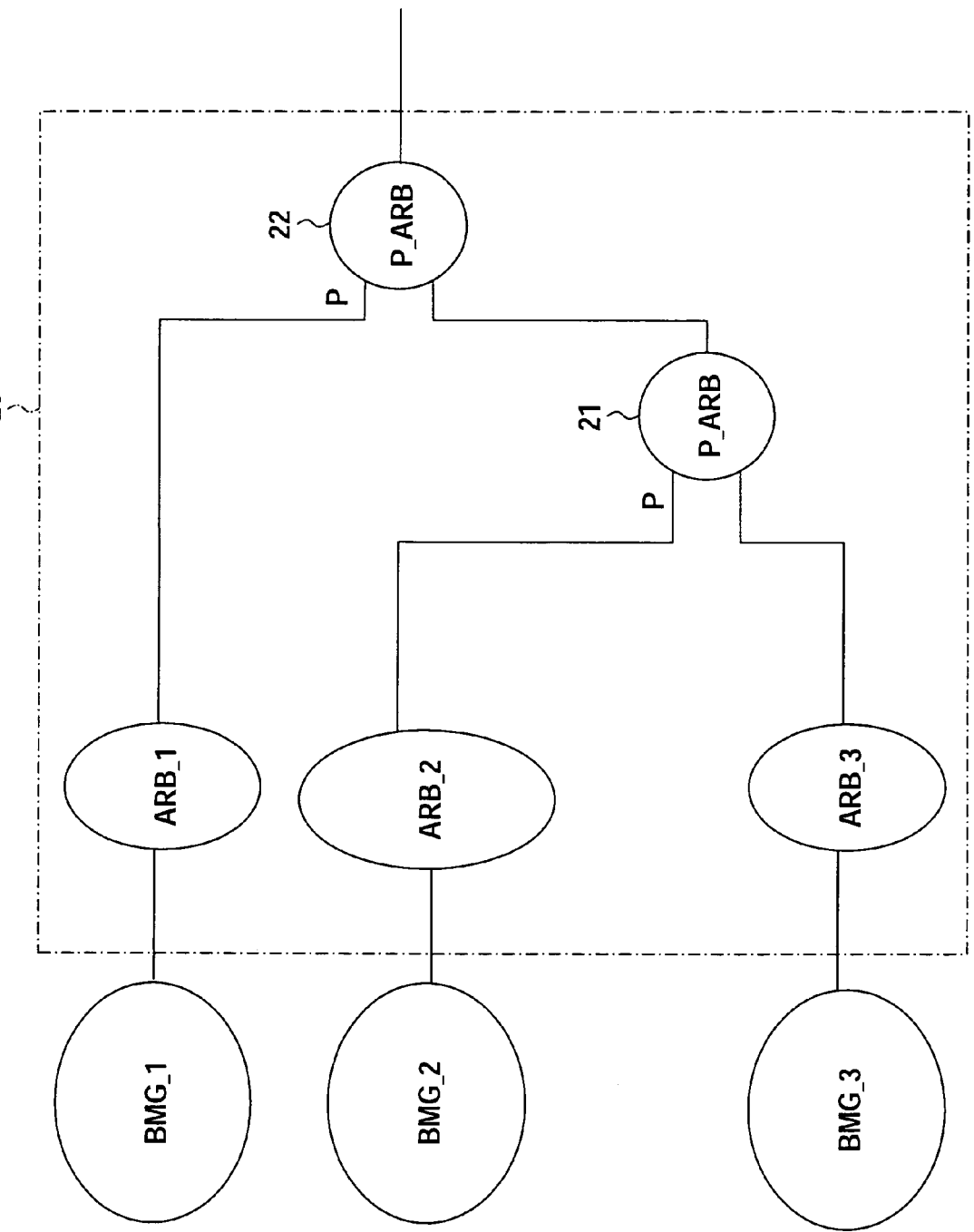
FIG. 2 is a view showing a configuration example of a hierarchical type arbiter related to an embodiment.

FIG. 2 shows an actual configuration of an arbiter 20 according to the present embodiment.

An arbiter according to the present embodiment has a first hierarchy arbitration circuit ARB_1 for arbitrating the first hierarchy bus master BMG_1 related to a data transfer request (REQ), a second hierarchy arbitration circuit ARB_2 for arbitrating the second hierarchy bus master BMG_2 related to a data transfer request (REQ) and a third arbitration circuit ARB_3 for arbitrating the third hierarchy bus master BMG_3 related to a data transfer request (REQ).

As shown in FIG. 2, the arbiter 20 according to the present embodiment is a bus arbitration apparatus having a tree structure as the whole.

Note that, the first hierarchy arbitration circuit ARB_1 corresponds to a first arbitration unit of the present invention, the second hierarchy arbitration circuit ARB_2 corresponds to a second arbitration unit of the present invention and the third hierarchy arbitration circuit ARB_3 corresponds to a third arbitration unit of the present invention.

The arbiter 20 according to the present embodiment has two arbitration circuits 21 and 22 further, as shown in FIG. 2.

The arbitration circuits 21 and 22 are arbitration circuits having tree structures and perform the arbitration of two inputted data transfer request. At that time, when either data transfer is requested, the data transfer request is given grant, and when both data transfer is requested, the data transfer request described as "P" is granted by priority.

Therefore, for example, when the data transfer request from the arbitration circuit ARB_2 and the arbitration circuit ARB_3 are present together, the arbitration circuit 21 grants the data transfer request from the arbitration circuit ARB_2 by priority. When the data transfer from the arbitration circuit ARB_2 is not requested, the data transfer request from the arbitration circuit ARB_3 by priority.

Hereinafter, an arbitration circuit having a tree structure and granting wither data transfer by priority like the arbitration circuits 21 and 22 is called as an arbitration-circuit-with-priority.

The arbiter 20 according to the present embodiment performs grant as mentioned below by having such a configuration.

Namely, the arbiter 20 according to the present embodiment gives a grant to use (GNT) for the bus master arbitrated by the first hierarchy arbitration circuit ARB_1 by priority.

Then, when the arbitration is not performed by the first arbitration circuit ARB_1 such as a case that the data transfer request (REQ) is performed in the first hierarchy bus master BMG_1, the data transfer grant (GNT) is given to the second hierarchy arbitration circuit ARB_2 by second priority.

Further, when the arbitration is not performed by the first hierarchy and the second hierarchy arbitration circuit ARB_1 and ARB_2, the data transfer grant (GNT) is given to the bus master arbitrated by the third hierarchy arbitration circuit ARB_3.

As mentioned above, the arbiter 20 according to the present embodiment categorizes arbitration into three hierarchies. It arbitrates the first hierarchy bus masters of which urgency requests are urgent by priority. Then it arbitrates by priority the second hierarchy bus master having necessity that data processing is performed in real time when the arbitration is not performed for the first hierarchy bus master. Then it arbitrates by priority the third hierarchy bus master when the arbitration is not performed for any of the first hierarchy and the second hierarchy bus masters. Therefore, an effective arbitration corresponding to increase of bus masters and diversification of system modes can be performed.

<Second Embodiment>

Next, an arbiter according to a second embodiment will be described.

The arbiter 20 mentioned in an explanation of the first embodiment has possibilities that the second hierarchy bus master fails because the first hierarchy bus master having high urgency basically. Namely, giving priority to all the request of the first hierarchy bus master means that a capability of the memory controller (MEM_C) 10 goes down seen from the second hierarchy bus master, and when the requests of each bus master is thickened, unprocessed data is increased and it is likely to go into a situation that the loss of transferred data may not be prevented.

Further, although the data processing apparatus has a configuration that when the data transfer request (REQ) from the second hierarchy bus master is centered in short time, as a result, the capability of the second hierarchy arbitration circuit ARB_2 is exceeded temporarily, a loss of the data transfer is avoided by compensating the data transfer related to unprocessed request while exceeded temporarily with the FIFO buffer, when the bus use request from the first hierarchy bus masters has no limit, the capability of the second hierarchy arbitration circuit ARB_2 is not decided and the loss of the data transfer may not be prevented.

Then, in an arbiter according to the present embodiment, a limit is installed to the data transfer request (REQ) from the first hierarchy bus master, and the arbiter 20 related to the first embodiment is changed so that the data transfer request from the first hierarchy arbitration circuit ARB_1 is arbitrated more preferentially than the second hierarchy arbitration circuit ABR_2.

Figure 3:
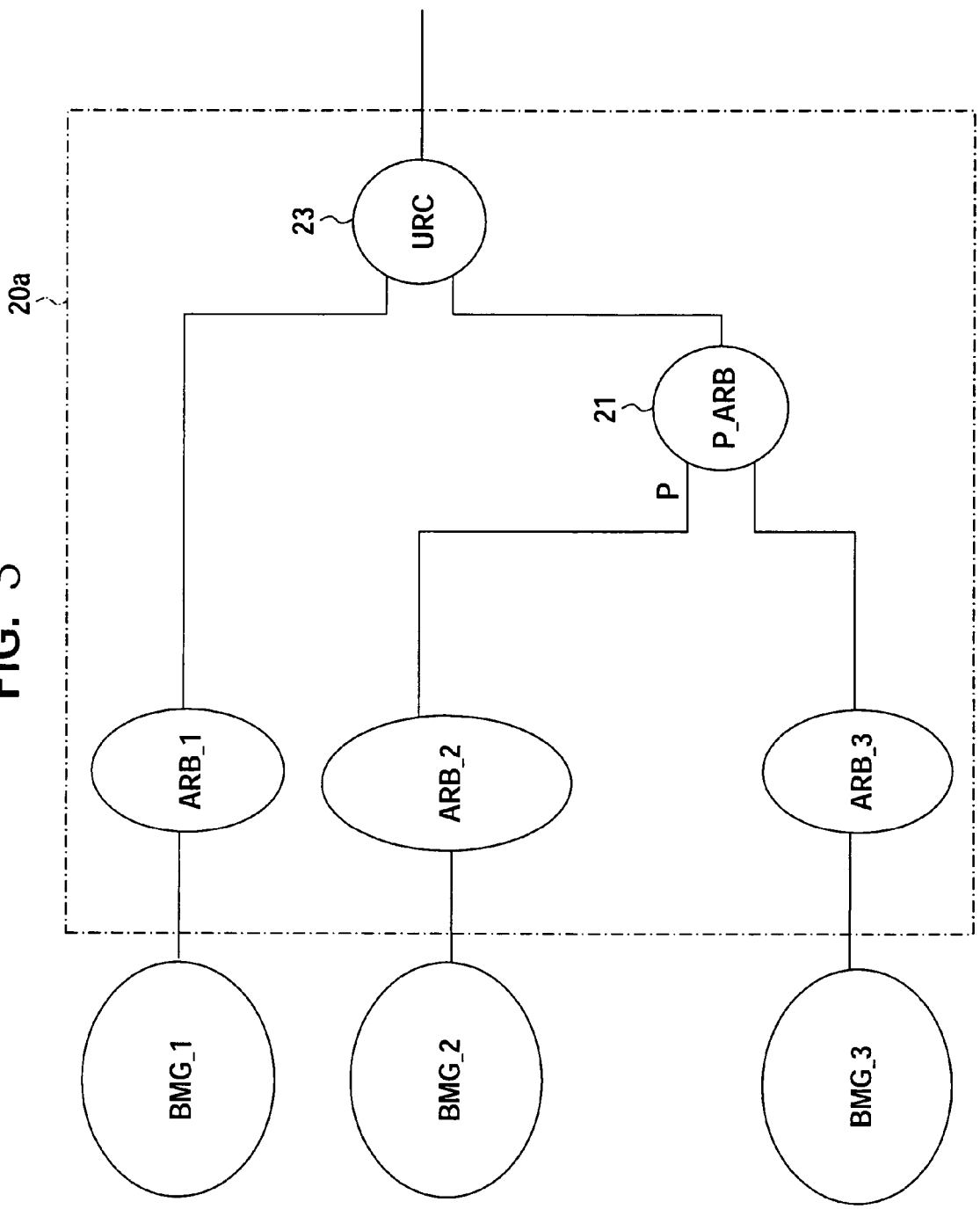
FIG. 3 is a view showing a configuration example of a hierarchical type arbiter related to an embodiment.

FIG. 3 shows a configuration of an arbiter 20a according to the present embodiment.

As shown in FIG. 3, the arbiter 20a according to an embodiment of the present invention is different from the arbiter 20 related to the first embodiment in the point of changing the arbitration circuit 22 to a bus use ratio controlling circuit (URC) 23.

Namely, the arbiter 20a according to an embodiment of the present invention has the bus use ratio controlling circuit 23 not to make the data transfer request from the first hierarchy arbitration circuit ARB_1 to give priority constantly, but to limit a bus occupation ratio by the first hierarchy bus master in response to the situation.

Note that, the bus use ratio controlling circuit 23 corresponds to a control unit of the present invention.

Figure 4:
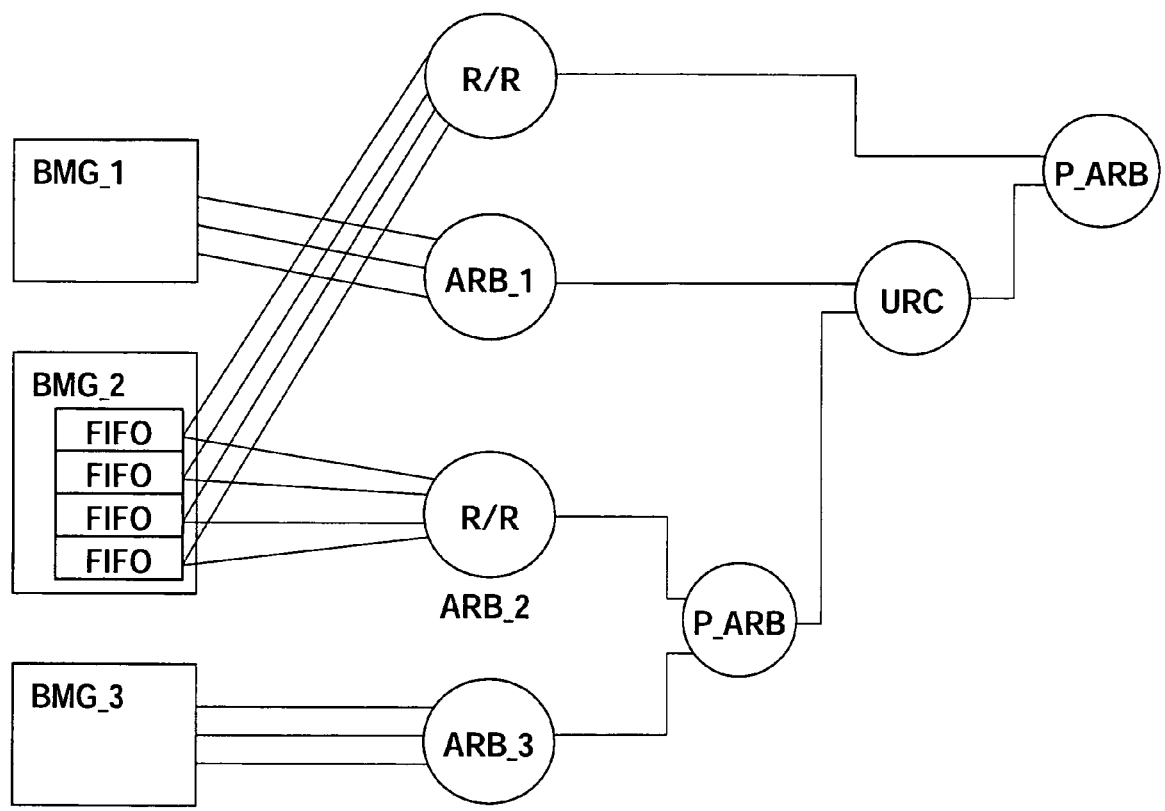
FIG. 4 is a view showing a configuration example of a hierarchical type arbiter related to an embodiment.
Figure 5:
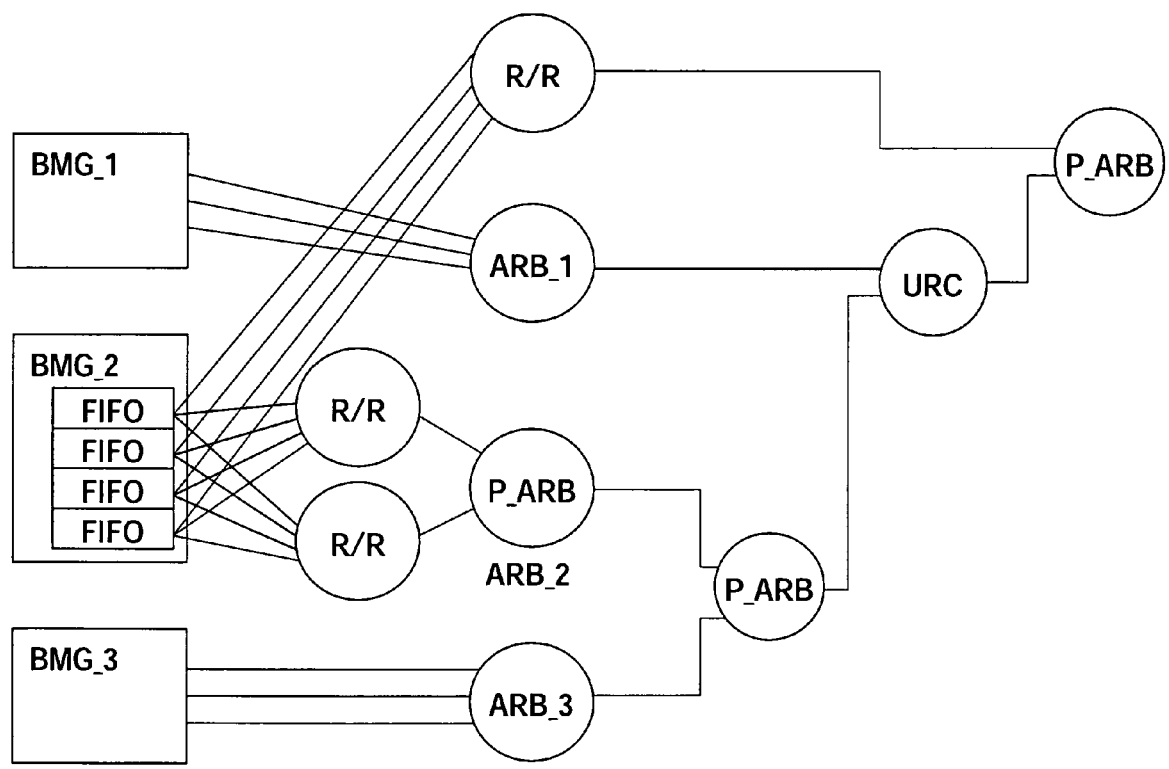
FIG. 5 is a view showing a configuration example of a hierarchical type arbiter related to an embodiment.

FIG. 4 and FIG. 5 are transformation example of the arbiter shown in FIG. 3. In each view, R/R indicates a round robin circuit.

As shown in FIG. 4, the round robin circuit may be installed further in the second hierarchy bus master in the arbiter 20a shown in FIG. 3 for a case that urgency is high such as a case that the FIFO buffer is immediately before failure. This round robin circuit functions an insurance hierarchy when estimation miss of the FIFO buffer.

Further, as shown in FIG. 5, the arbiter shown in FIG. 4 may be configured that the second hierarchy bus master changes a data transfer request destination in response to the condition of the FIFO buffer.

Figure 6:
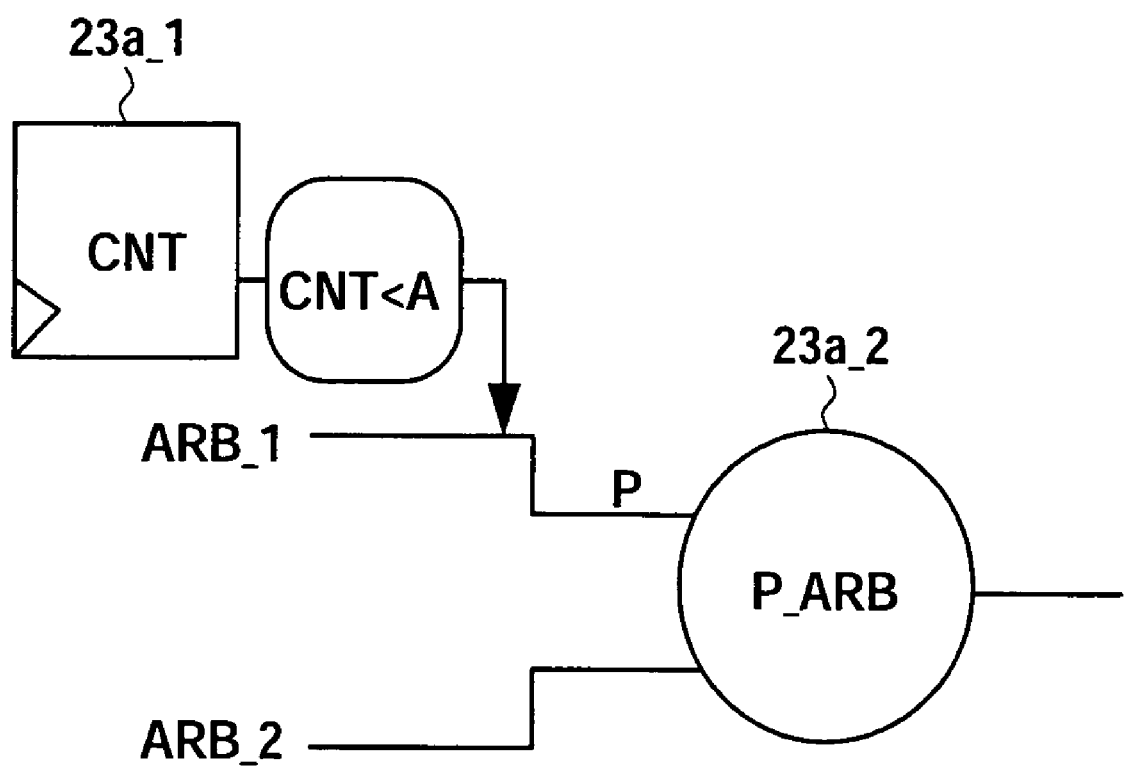
FIG. 6 is a view showing a configuration example of a bus use ratio controlling circuit.

FIG. 6 shows a bus use ratio controlling circuit 23a that is a configuration example of the bus use ratio controlling circuit 23. As shown in the view, the bus use ratio controlling circuit 23a includes a counter 23a_1 and an arbitration circuit 23a_2.

The counter 23a_1 counts a predetermined data transfer cycle. Namely, the counter 23a_1 functions as a timer actually.

The arbitration circuit 23a_2 is an arbitration-circuit-with-priority similar to the arbitration 21 and 22 shown in FIG. 2.

When a count value CNT of the counter 23a_1 is less than a predetermined threshold value A, in the case that the data transfer is requested by the arbitration circuit ARB_1 and ARB_2, the arbitration circuit 23a_2 gives grant to the data transfer request from the arbitration circuit ARB_1 by priority. In the case that the data transfer is not requested by the arbitration circuit ARB_1, it gives grant to the data transfer request from the arbitration circuit ARB_2.

By contraries, when the count value CNT has approached to the predetermined value A, the arbitration circuit 23a_2 gives grant to the data transfer request from the arbitration circuit ARB_2 by priority.

Since a limit is installed to the occupation ratio of the bus by the first hierarchy bus master by configuring the arbiter 20a as mentioned above, it becomes to possible to judge the capability of the memory controller (MEM_C) 10 for the data transfer from the second hierarchy bus master, and the loss of the data transfer becomes possible to be prevented.

<Third Embodiment>

Hereinafter, it will be described about a data processing apparatus according to the third embodiment.

There is a case that an occupation ratio of the bus of the first hierarchy bus master may not be controlled adequately by the arbiter 20a according to the above mentioned second embodiment. It is the case that the maximum traffic of a predetermined data processing cycle is decided, however, the data transfer request (REQ) is performed while the predetermined data processing cycle, such that the first hierarchy bus master operates by a constant data processing cycle.

In this case, although the bus use ratio controlling circuit 23a mentioned in the second embodiment can satisfy the request of the first half of the predetermined processing cycle that is within a range the count value CNT of the counter 23a_1 does not satisfy the threshold value A (first threshold value in the present invention), it may not satisfy the last half of the predetermined data processing cycle after the count value CNT approaches the threshold value A and the first hierarchy loses priority of bus use.

On the contrary, when the occupation ratio of the first hierarchy bus master is made to increase by increasing the predetermined threshold value A, as the case, there is a possibility that the first hierarchy bus master occupies the bus completely.

Namely, this means that a fluctuation width of the best case and the worst case becomes large about the data transfer of the second hierarchy. In this case, when the worst case is considered, the capability of the entire first and second hierarchies is made to descend.

Consequently, in an arbiter according to the present embodiment, number of the data transfer by the first hierarchy bus master in the predetermined transfer cycle is counted, and the data transfer request (REQ) of the bus master is limited depending on the count result.

Figure 7:
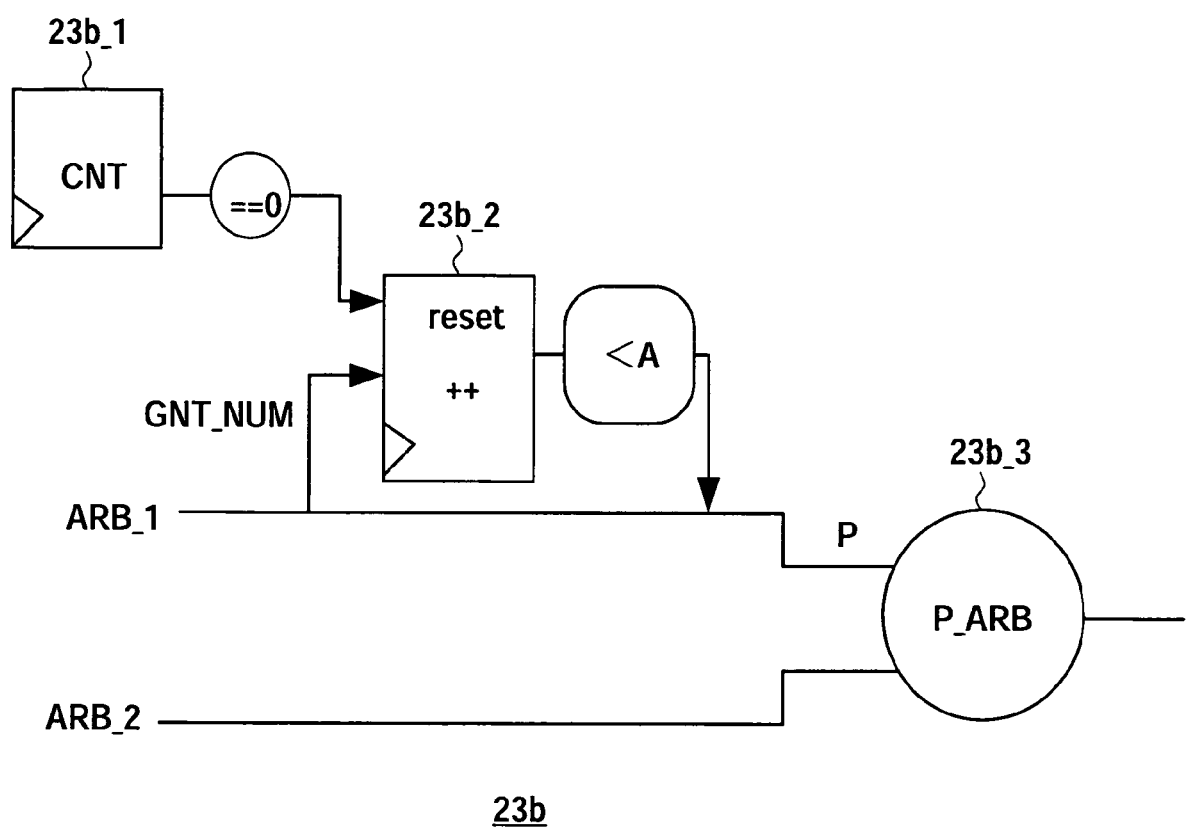
FIG. 7 is a view showing a configuration example of a bus use ratio controlling circuit.

FIG. 7 shows a configuration example of a bus use ratio controlling circuit 23b of the arbiter according to the present embodiment. As shown in the view, the arbiter according to the present embodiment is different from the arbiter related to the second embodiment in only the bus use ratio controlling circuit. Further, the bus use ratio controlling circuit 23b includes counters 23b_1 and 23b_2 and an arbitration circuit 23b_3.

The counter 23b_1 performs a countdown from a predetermined initial value and when approaching to "0", it resets the counter 23b_2. Namely, the counter 23b_1 functions as a timer.

The counter 23b_2 counts number of data transfer GNT_NUM related to the use of the bus granted to the first hierarchy bus master BMG_1. Since it counts number of data transfer GNT_NUM until being rested by the counter 23b_1, number of the data transfer of the first hierarchy in a predetermined period is calculated.

The arbitration circuit 23*b*_3 is an arbitration-circuit-with-priority mentioned previously.

Then, when a count value CNT of the counter 23*b*_2 is less than a predetermined threshold value A, in the case that the data transfer is requested by the arbitration circuit ARB_1 and ARB_2, the arbitration circuit 23*b*_3 gives grant to the data transfer request from the arbitration circuit ARB_1 by priority. In the case that the data transfer is not requested by the arbitration circuit ARB_1, it gives grant to the data transfer request from the arbitration circuit ARB_2.

By contraries, when the count value CNT has approached to the predetermined value A, the arbitration circuit 23*b*_3 gives grant to the data transfer request from the arbitration circuit ARB_2 by priority.

By configuring the arbiter as mentioned above, arbitration in which the capability of the memory controller seen from the second hierarchy can be judged becomes possible. Further, even when the first hierarchy bus master performs the request (REQ) at random times in the predetermined cycle, it becomes possible to be performed arbitration by the predetermined number of requests.

When the request (REQ) of the first hierarchy bus master is concentrated in short time within the predetermined cycle, the loss of the data transfer of the second hierarchy bus master may not be prevented. However, when the value of the predetermined cycle is installed adequately, an operation of the first hierarchy bus master can be suppressed and the fluctuation for the processing of the second hierarchy bus master can be suppressed.

<Fourth Embodiment>

Hereinafter, it will be described about a data processing apparatus according to a fourth embodiment.

When there is a difference in cycle number necessary for one data transfer by the first hierarchy bus master, there is a case that a fluctuation for the capability of the second hierarchy bus master becomes large by only counting number of the data transfer GNT_NUM like the arbiter according to the third embodiment mentioned above.

For example, when number of the data transfer performed by the first hierarchy bus master changes to eight cycles, 16 cycles and 20 cycles and so on, time that the first hierarchy bus master occupies the bus is different greatly between the case that all the data transfer is performed at eight cycles and the case that all the data transfer is performed at 20 cycles, by only counting number of the data transfer. As a result, a fluctuation of the processing for the second hierarchy bus master becomes large.

Consequently, an arbiter according to the present embodiment grants the arbitration so that the cycle number necessary for the data transfer for every data transfer is obtained, the cycle number is counted for a predetermined time, until the number approaches a predetermined number the first hierarchy bus master is gave priority, and capability of the capability of the memory controller MEM_C.

Figure 8:
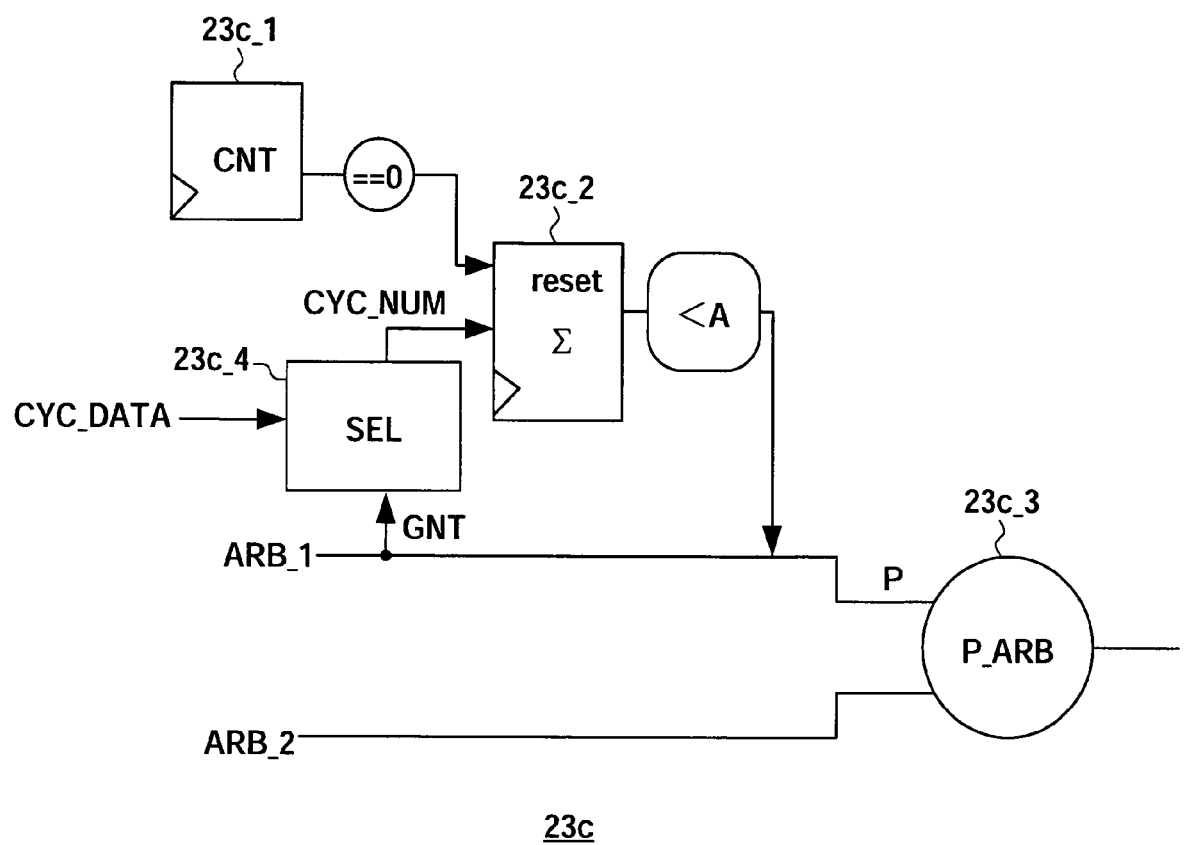
FIG. 8 is a view showing a configuration example of a bus use ratio controlling circuit.

FIG. 8 shows a configuration example of the bus use ratio controlling example according to the present embodiment.

The arbiter according to the present embodiment is different from the arbiter related to the second embodiment in only the bus use ratio controlling circuit. Further, as shown in the view, the bus use ratio controlling circuit includes a counter 23*c*_1, an accumulator 23*c*_2, an arbitration circuit 23*c*_3 and a selector 23*c*_4.

The counter 23*c*_1 performs a countdown from a predetermined value and when approaching to "0", it resets the counter 23*c*_2. Namely, the counter 23*c*_1 functions as a timer.

Information CYC_DAYA about the cycle number of the worst case necessary for each kind of the data transfer (for example, read/write processing) is given to the selector 23*c*_4 in FIG. 8 preliminary and the cycle number CYC_NUM of the worst case necessary for kind of the data transfer granted (GNT) by the first hierarchy bus master is selected from among preliminary given CYC_DATA and outputted it sequentially.

The accumulator 23*c*_2 accumulates the cycle number outputted from the selector 23*c*_4 sequentially. At that time, since the cycle number is accumulated until being reset by the counter 23*c*_1, the sum of the cycle number (total cycle number) of data transfer granted by the first hierarchy bus master is calculated.

The arbitration circuit 23*c*_3 is an arbitration-circuit-with-priority mentioned previously.

Then, when a total cycle number calculated by the accumulator 23*c*_3 is less than a predetermined threshold value A (second threshold value in the present invention), in the case that the data transfer is requested by the arbitration circuit ARB_1 and ARB_2, the arbitration circuit 23*b*_3 gives grant to the data transfer request from the arbitration circuit ARB_1 by priority. In the case that the data transfer is not requested by the arbitration circuit ARB_1, it gives grant to the data transfer request from the arbitration circuit ARB_2.

By contraries, when the total cycle number calculated by the accumulator 23*c*_2 has approached to the predetermined value A, the arbitration circuit 23*c*_3 gives grant to the data transfer request from the arbitration circuit ARB_2 by priority.

By configuring the arbiter as mentioned above, even when there is a difference in the cycle number necessary for one data transfer by the first hierarchy bus master, the arbitration in which the capability of the memory controller MEM_C is judged when seen from the second hierarchy can be possible.

<Fifth Embodiment>

Hereinafter, it will be described about a data processing apparatus according to a fifth embodiment.

In the data processing device related to the fourth embodiment, the cycle number necessary for kinds of each data transfer (for read/write processing) given to the selector 23*c*_4 depends on the previous data transfer usually. For example, even when the amount of data transferred is equivalent, the cycle number necessary for the data transfer for "write" is different between the cases that the previous command is "read" and "write" usually.

In the case that cycles having width from 8 to 10 is necessary for a data transfer related to a certain command A and cycles having width from 16 to 22 is necessary for a data transfer related to a certain command B, if the cycle number is fixed to a standard cycle for each command (for example, fix as command A: nine cycles, command B: 20 cycles) and processing of the selector 23*c*_4, the capability for the second hierarchy bus master is influenced when the worst case of the data transfer (22 cycles) by the command B is continued in a certain data processing cycles.

Consequently, a data processing apparatus according to the present embodiment calculates a data transfer cycle of the worst case (in the above example, command A: 10 cycles, command B: 22 cycle) preliminary for each kind of the data transfer and gives it to the arbiter, further the arbiter processes by considering that the worst case of the data transfer is necessary.

Concretely, the bus use ratio controlling circuit according to an embodiment of the present invention is equivalent to a configuration of the bus use ratio controlling circuit 23c related to the fourth embodiment described by referring to FIG. 8. However, it is different in a point that information about the cycle number of the worst case necessary for each kind of the data transfer (for example, read/write processing) is given to the selector 23c_4 in FIG. 8 preliminary and the cycle number of the worst case necessary for kind of the data transfer granted (GNT) by the first hierarchy bus master is selected and outputted it sequentially.

As a result, even when the cycle number of the data transfer by the first hierarchy bus master is fluctuated, the data transfer is processed stably and the arbitration able to judge the capability of the memory controller MEM_C when seen from the second hierarchy bus master is granted.

At the time, since the bus use ratio controlling circuit 23c according to an embodiment of the present invention performs processing based on the data transfer cycle of the worst case, when not becoming the data transfer cycles of the worst case in the actual data transfer, despite that processing for the first hierarchy bus master is generated more, the first hierarchy bus master may concede the bus use rights to the second and third hierarchy bus master. However, since the bus use rights of the ratio by the amount assuring even in the data transfer cycle of the worst case is given to the first hierarchy bus master, there is no issue.

Note that, as mentioned above, since the cycle number necessary for each kind of data transfer given to the selector 23c_4 in FIG. 8 depend on also depend on the previous data transfer usually, for controlling the bus occupation ratio for the first hierarchy bus master more correctly, the selector 23c_4 can be configured not to perform processing based on the data transfer cycle of the worst case as mentioned above, but to output the cycle number CYC_NUM in response to a combination result considering the previous data transfer.

However, when it is difficult to calculate the cycle number necessary for the data transfer in response to a combination because there are many kinds of the data transfer, or when it is difficult to add a circuit for the calculation, it is desirable to perform the processing mentioned in the present embodiment.

<Sixth Embodiment>

Hereinafter, it will be described about a data processing apparatus according to a sixth embodiment.

According to the bus use ratio controlling circuit related to the fourth and fifth embodiment, when the total cycle number calculated by the accumulator 23c_2 is less than the predetermined threshold value A, the arbitration circuit 23c_3 gives priority to the data transfer request from the first hierarchy arbitration apparatus ARB_1 and arbitrates it. In the case of the data transfer that exceeds this predetermined threshold value A a little, how it should be arbitrated becomes an issue.

Namely, in the case that the total cycle number is over the predetermined threshold value A calculated from the accumulator 23c_2, when the data transfer is limited usually, the first hierarchy bus master loses a certain degree of the data transfer cycle for every data processing cycle. This means that a fluctuation of the capability for the second hierarchy bus master changes depending on installing of the predetermined threshold value A because if the predetermined threshold value is installed at a little large, the significant data transfer processing can be finished.

Meanwhile, in the case that the total cycle number is over the predetermined threshold value A calculated from the accumulator 23c_2, when the data transfer over the threshold A is not limited, in a similar way, a fluctuation of the capability for the second hierarchy bus master changes depending on installing of the predetermined threshold value A.

Therefore, the bus use ratio controlling circuit 23d according to the present embodiment enables the arbitration that the capability of the memory controller MEM_C when seen from the second hierarchy can be judged without depending on the predetermined threshold value A.

Concretely, in a certain data processing cycle, when the total cycle number of the data transfer is over the predetermined threshold value A a little, the data transfer over the threshold value A is granted. Further, the cycle number that the data transfer of the first hierarchy is over the predetermined threshold value A is descended form the predetermined threshold value A in the next processing cycle and the first hierarchy data transfer in the next data processing cycle is limited further from the predetermined threshold value A.

The cycle number that granted even when being over the predetermined threshold value A is installed preliminary.

Figure 9:
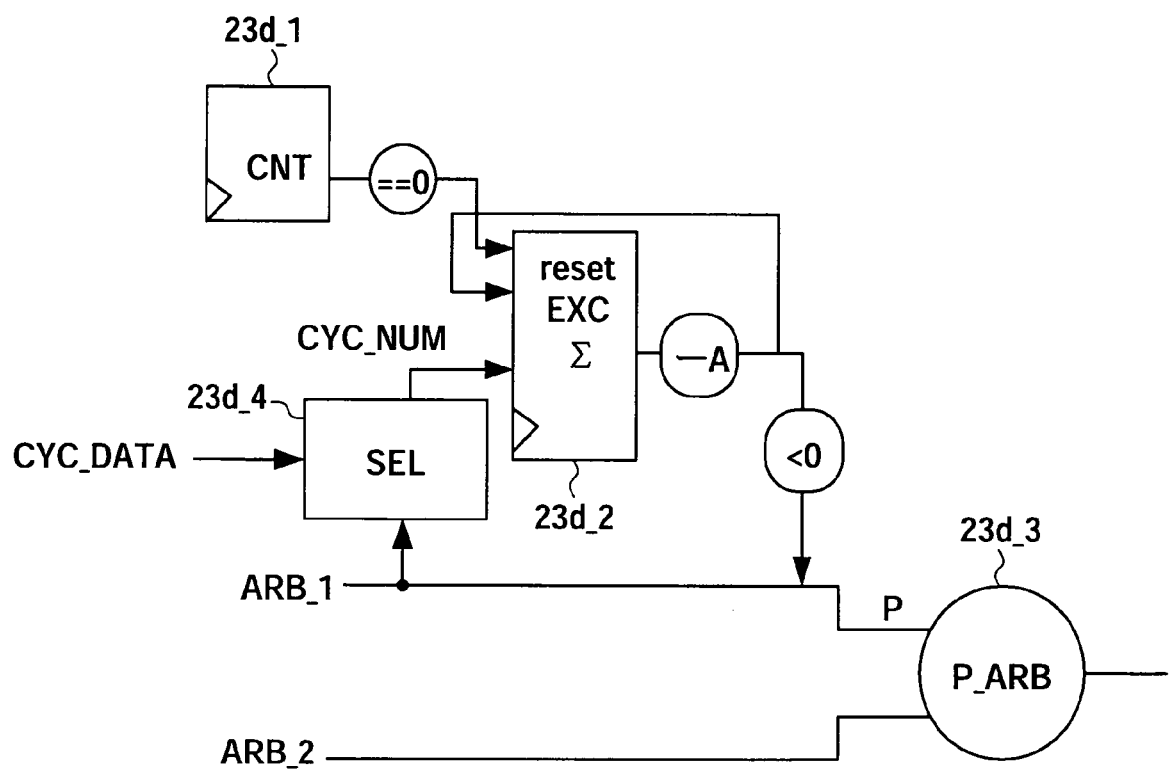
FIG. 9 is a view showing a configuration example of a bus use ratio controlling circuit.
Figure 11:
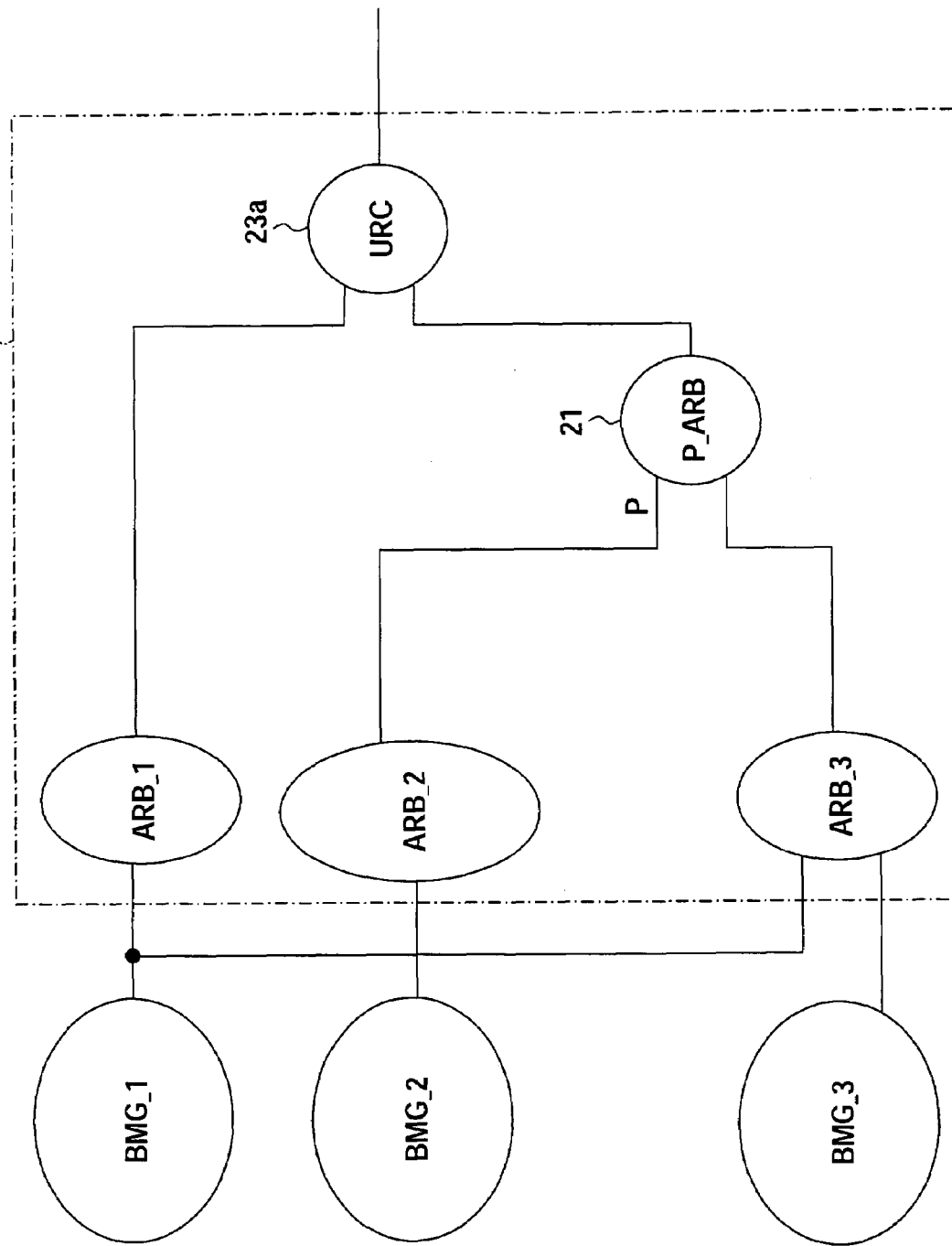
FIG. 11 is a view showing a configuration example of a hierarchical type arbiter related to an embodiment.

FIG. 9 shows a configuration example of a bus use ratio controlling circuit according to the present embodiment.

The bus use ratio controlling circuit 23d includes a counter 23d_1, an accumulator 23d_2 and a selector 23d_4.

The counter 23d_1 performs a countdown from a predetermined initial value and when approaching to "0", it resets the counter 23d_2. Namely, the counter 23d_1 functions as a timer.

Information CYC_DAYA about the cycle number of the worst case necessary for each kind of the data transfer (for example, read/write processing) is given to the selector 23d_4 in FIG. 8 preliminary and the cycle number CYC_NUM of the worst case necessary for kind of the data transfer granted (GNT) by the first hierarchy bus master is selected from among preliminary given CYC_DATA and outputted it sequentially.

The accumulator 23d_2 accumulates the cycle number outputted from the selector 23d_4 sequentially. At that time, since the cycle number is accumulated until being reset by the counter 23d_1, the sum of the cycle number (total cycle number) of data transfer granted by the first hierarchy bus master is calculated.

The arbitration circuit 23d_3 is an arbitration-circuit-with-priority mentioned previously.

Then, when the predetermined threshold value A is reduced from the total cycle number and the reduction result is negative, in the case that the data transfer is requested by the arbitration circuit ARB_1 and ARB_2, the arbitration circuit 23d_3 gives grant to the data transfer request from the arbitration circuit ARB_1 by priority. In the case that the data transfer is not requested by the arbitration circuit ARB_1, it gives grant to the data transfer request from the arbitration circuit ARB_2.

Meanwhile, when the predetermined threshold value A is reduced from the total cycle number and the reduction result is possible and a preliminary granted value or less, namely, the total cycle number of the data transfer is over the predetermined threshold value A a little, the data transfer over the threshold value A is granted.

Then, the accumulator 23d_2 holds the cycle number over the predetermined threshold value A (excess cycle number: EXC) until the data processing cycle of the next processing, and in the next processing, the calculated total cycle number and the previous excess cycle number EXC are added and processed. As a result, in the data processing cycle of the next processing, the first hierarchy data transfer is further limited by the previous excess cycle number.

After the total cycle number of the data transfer is over the predetermined threshold value A a little and the data transfer over the threshold value A is granted, the arbitration circuit 23b_3 selects the second hierarchy bus master to give the bus use rights to the second hierarchy bus master.

By configuring the bus use ratio controlling circuit 23d as mentioned above, even when the data transfer for the first hierarchy bus master is carried out a little a lot in a certain data processing cycle, in the next data processing cycle, the data transfer of the first hierarchy bus master is limited at that much. Therefore, seeing a whole, the bus occupation ratio of the first hierarchy bus master is averaged, and the fluctuation of the capability of the second hierarchy bus master disappears approximately.

FIG. 10 are views describing processing for the first hierarchy bus master mentioned above. FIG. 10A shows Nth and N+1th processing and FIG. 10B shows N+1th and N+2th processing respectively.

As shown in FIG. 10A, in Nth processing, the processing of the excess cycle over the predetermined threshold value A that is the cycle number granted for the data transfer of the first hierarchy is performed by reducing the predetermined threshold value A granted for the N+1th processing. Previously, it explained by referring to FIG. 9 that the calculated total cycle number and the excess cycle number are added and compared with the predetermined threshold value A. Although, this is the equivalent processing to the processing that the threshold value is reduced by the excess cycle number in the N+1th processing practically as shown in FIG. 10A.

Further, as shown in FIG. 10B, when the excess cycle is generated in the N+1th processing, the processing is performed by reducing the threshold value granted for the N+2th processing in a similar way.

Note that, on the contrary to the above-mentioned method, when the total cycle number is over the predetermined threshold value A, a method can be considered, wherein the method is a method increasing the ratio of the processing of the first hierarchy in the processing of the next data processing cycle by reducing the excess cycle number EXC from the total cycle number without granting the data transfer of the excess.

However, this method has a possibility that it is difficult to distinguish the cycle that the limit is given and the data transfer is not granted in the previous data processing cycle and the cycle that remains because there is no the data transfer request actually. Namely, when accumulating the remained cycle number because there is no data transfer request (REQ), the first hierarchy bus master uses the accumulated cycles at the one time in a certain data processing cycle and the processing for the first hierarchy bus master might occupy the bus completely. Therefore, as the above-mentioned method, the excess data transfer should be granted in the previous processing cycle and the excess cycle number only should be limited in the later data processing cycle.

<Seventh Embodiment>

Hereinafter, it will be described about a data processing apparatus according to a seventh embodiment.

The data processing apparatus related to the above each embodiment performs the arbitration making it able to judge the capability of the memory controller MEM_C seen from the second hierarchy bus master by limiting the processing for the first hierarchy bus master.

Therefore, in an arbiter according to the present embodiment, when the first hierarchy bus master that the data transfer request (REQ) is not granted exists by the limitation for the first hierarchy bus master, the first hierarchy bus master BMG_1 performs the data transfer request to the third hierarchy arbitration circuit.

Note that, since there is the above-mentioned limitation for the first hierarchy bus master to prevent the loss of the data transfer of the second hierarchy bus master, even when the third hierarchy arbitration circuit ARB_3 arbitrates the data transfer request from the first hierarchy bus master BMG_1, the loss of the data transfer of the second hierarchy bus master is unaffected.

<Eighth Embodiment>

Hereinafter, it will be described about a data processing apparatus related to an eighth embodiment.

The arbiter of the data processing apparatus related to the above-mentioned each embodiment, as shown in FIG. 3, has a configuration that the first hierarchy arbitration circuit ARB_1 limits the data transfer for the first hierarchy by the bus use ratio controlling circuit for the arbitration result of the first hierarchy bus master BMG_1. However, the above configuration is expanded in the present embodiment, it is configured that the bus use ratio controlling circuit is installed in every bus master included in the first hierarchy bus master BMG_1 and the bus use ratio is controlled in every bus master.

As a result, the more accurate arbitration in response to each bus master can be possible.

<Ninth Embodiments>

Hereinafter, it will be described about a data processing apparatus according to a ninth embodiment.

The arbiter of the data processing apparatus related to the above-mentioned each embodiment has a configuration that the first to the third hierarchy bus masters are classified in response to the property of the bus master depending on the client and the first to the third hierarchy arbitration circuit perform the arbitration for each bus master. However, the arbitration might not be performed for every bus master and it might be decided which hierarchy arbitration circuit might be performed the data transfer request for every data transfer request.

For example, since there may be situations such that a certain data transfer is necessary to be performed the processing early and that a certain transfer may be processed at the comparatively long time, when configuring that the selection of the arbitration circuit related to the bus use request is changed for every data transfer, the capability as a whole is improved. Namely, performing the arbitration by which of the first to the third hierarchy bus arbitration circuits is decided in response to latency that should be secured corresponding to the data transfer request given to each bus master.

Note that, in consideration of the case of failing an estimation of the failure of the FIFO buffer of the second hierarchy bus master, another hierarchy performing emergency processing that has higher priority than the first hierarchy may be installed.

<Tenth Embodiment>

Hereinafter, it will be described about a data processing apparatus according to a tenth embodiment.

The client that the output result may be sent for every predetermined processing cycles (for example, V unit), but the bus use grant (GNT) should be received at extremely short time from sending the bus use request (REQ) exists. For example, it is the case that when diverting IP designed in the past and so on, the maximum value of the time from sending the data transfer request until receiving the data actually is decided and the value is designed small.

In such a client, although the timing sending the bus use request (REQ) is averaged comparatively, the request for the latency is extremely high.

Hereinafter, a bus master corresponding to such a client is called as a bus master 1A.

Meanwhile, the CPU and so on are clients of the same first hierarchy, the request for the latency is extremely high in a similar way, however, the timing sending the bus use request (REQ) is not averaged in the processing cycle and sporadic.

Hereinafter, a bus master corresponding to such a client is called as a bus master 1B.

An arbiter according to the present embodiment has a first hierarchy arbitration circuit for performing the arbitration effectively for the client of the first hierarchy that has a different property mentioned above.

Figure 12A:
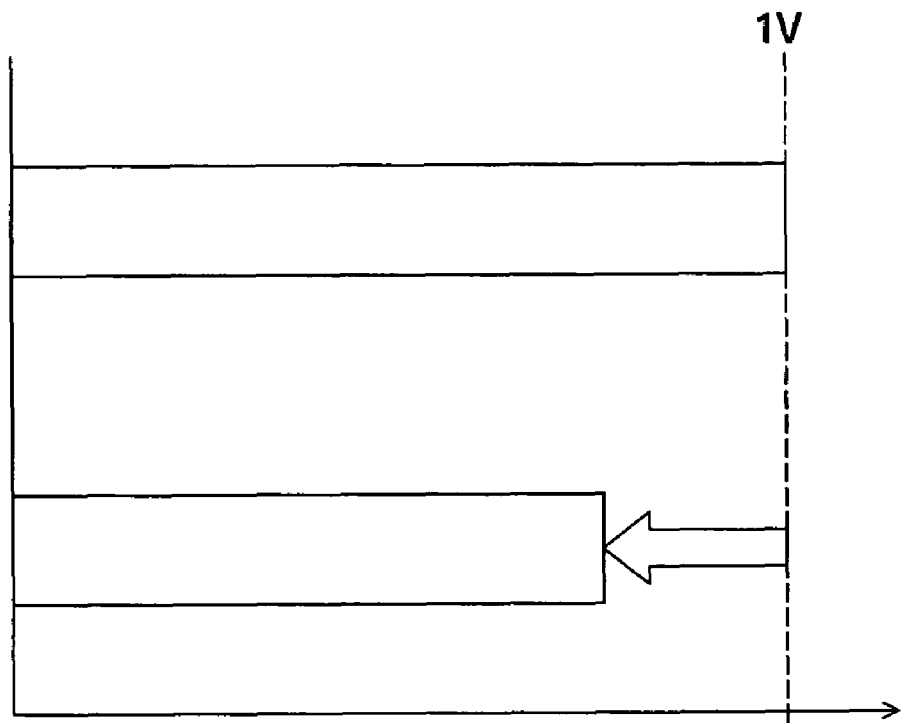
FIGS. 12A and 12B are views for explaining an arbiter related to a tenth embodiment.
Figure 12B:
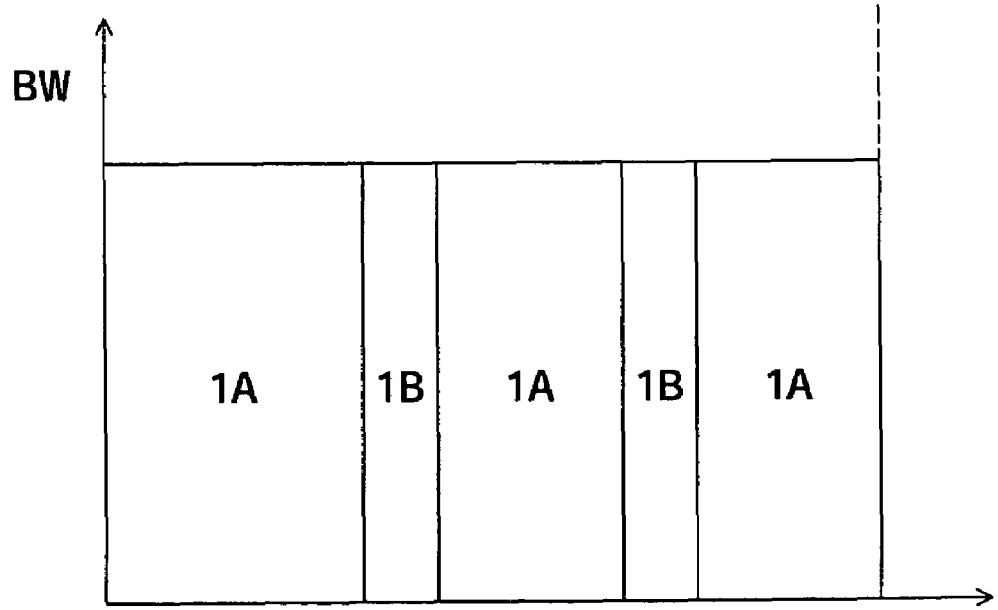

Hereinafter, the operation of the first hierarchy arbitration according to the present embodiment will describe with relating to FIG. 12.

First, a circuit increasing clock frequency for the processing of the bus master 1A sending the bus use request (REQ) on comparatively average is installed. As a result, on the condition that the only processing of the bus master 1A is performed by the processing cycle of 1V units, although the occupation band width of the bus is increased, the processing is ended earlier than 1V (FIG. 12A).

When the bus use request (REQ) is performed from the bus master 1B that has sporadic timing for sending the bus use request (REQ), the first hierarchy arbitration circuit stops the clock for the bus master 1A and performs the data transfer processing for the bus master 1B. As a result, the bus master 1B corresponding to the CPU and so on can occupy the wide bus width completely for this time.

For stopping the clock, the first hierarchy arbitration circuit sends a clock stopping use control signal to the client corresponding to the bus master 1A.

When the data transfer by the bus master 1 IS ENDED, a clock starting use control signal is sent to the client corresponding to the bus master 1A for restarting the operation of the stopped clock.

As explained above, in the first hierarchy arbitration circuit according to the present embodiment, in the arbitration example according to the present embodiment, the clock performing the client related to the bus master 1A is stopped completely based on the bus use request (REQ) and, in the meanwhile, the wide band width is occupied by the bus master 1B. Then, the bus master 1A performing the averaged data transfer performs the data transfer by occupying more wide band width in the high clock frequency in much time in the predetermined processing cycle.

As a result, the data transfer by the bus master 1A and the bus master 1B of which properties related to the bus use are different can be performed effectively.

Note that, for assuring the processing of the client related to the bus master 1A, number that the clock is stopped and the control of the bus master 1B may be performed by the number.

<Eleventh Embodiment>

Hereinafter, it will be described about an eleventh embodiment of the present invention.

Generally, the requests of each bus master for the data transfer are different in response to the property of the corresponding client. For example, a certain bus master has a limit in the amount of the data of the corresponding FIFO buffer, a certain bus master has a limit in the assuring time, and a certain bus master has no limits in the assuring time but has necessity to process the data quickly as possible.

Since it is difficult to arbitrate the various requests for such the data transfer uniformly, an arbiter according to the present embodiment is characterized that the bus master side decides the priority level of the bus use request (REQ) and the arbitration is performed based on the priority level.

At that time, the priority level decided in each bus master is the urgency for the data transfer defined based on a unique rule by each bus master and each bus master decides the urgency according to the rule defined for each transfer.

Figure 13B:
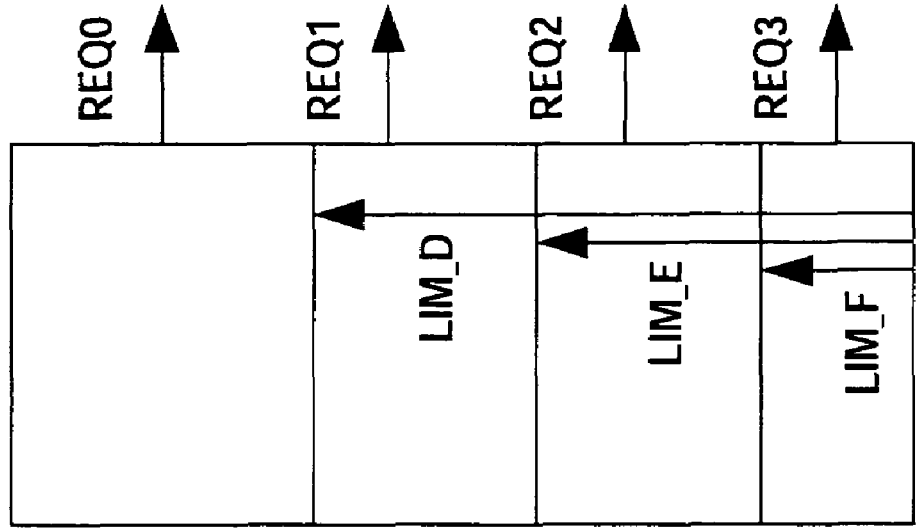
FIGS. 13A and 13B are views exemplifying a bus master performing a data transfer request having a priority level in response to an amount of data of a FIFO buffer.
Figure 13A:
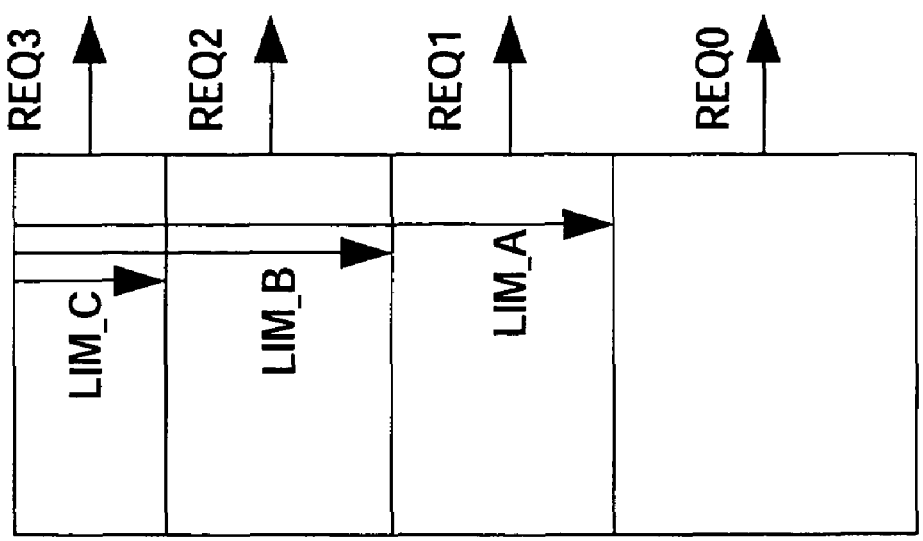

FIGS. 13A and 13B are views exemplifying a bus master performing a data transfer request having a priority level in response to the amount of the data of the FIFO buffer, FIG. 13A shows a data transfer request in the write processing and FIG. 13B shows a data transfer request in the read processing respectively.

As shown in FIG. 13A, in the write request, the data transfer requests REQ0 to REQ3 corresponding to the amount of the data stored in the FIFO buffer are outputted based on predetermined limits LIM_A to LIM_C. At that time, the amount of the data of the FIFO buffer compared with each limit LIM_A to LIM_C is the amount of the data (predicted value) of the FIFO buffer when assuming that the request is granted.

In the write processing shown in FIG. 13A, the more amounts of the data stored in the FIFO buffer previously is, the more danger of the overflow is and the higher the urgency is. Therefore, the data transfer request has the priority level in the order of REQ0, REQ1, REQ2 and REQ3 as shown in the view.

On the contrary, as shown in FIG. 13B, in the read request, the data transfer requests REQ0 to REQ3 corresponding to the amount of the data stored in the FIFO buffer are outputted based on predetermined limits LIM_D to LIM_F. At that time, the amount of the data of the FIFO buffer compared with each limit LIM_D to LIM_F is the amount of the data (predicted value) of the FIFO buffer when assuming that the request is granted.

In the read processing shown in FIG. 13B, the less amount of the data stored in the FIFO buffer previously is, the more danger of the underflow is and the higher the urgency is. Therefore, the data transfer request has the priority level in the order of REQ0, REQ1, REQ2 and REQ3 as shown in the view.

The data transfer request with the priority level in response to the amount of the data of the FIFO buffer as shown in FIGS. 13A and 13B is an example, the priority level decided and the data transfer request can be performed in response to various factors except for the amount of the data of the FIFO buffer.

For example, a bus master that the data transfer time is decided at the predetermined intervals (such as the display processing of a digital TV) changes the priority level of the data transfer request depending on how much time it has (how many cycles remain) for the data transfer rime in response to the requesting time. At that time, when the clock frequency has a difference between the bus masters, the cycle number for the data transfer time may be changed in response to the clock frequency.

Further, the range of the request signals may be different for every bus master. For example, a certain bus master may not send a request that the priority level is high (for example, output REQ0 and REQ1), or a certain bus master may send a request that the priority level is high constantly (for example, output REQ3 constantly).

As mentioned above, in the data processing device according to the present embodiment, each bus master performs the data transfer request in response to the priority level. The configuration of the arbiter at that time is shown in FIG. 14.

Figure 14:
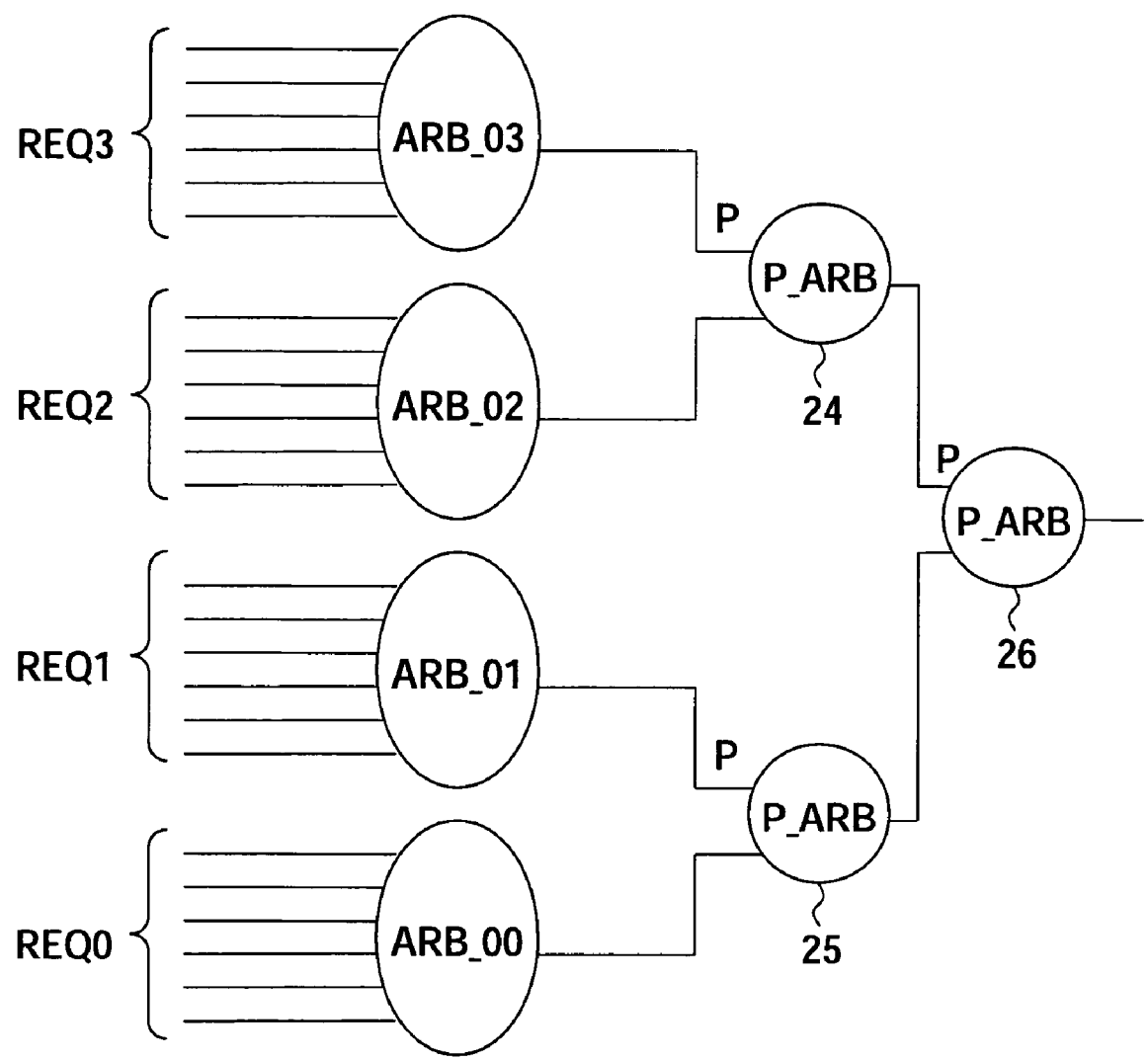
FIG. 14 is a view showing a configuration of an arbiter in a case that each bus master performs a data transfer request in response to a priority level.

The arbiter shown in FIG. 14 includes four arbitration circuit ARB_00 to ARB_03 in response to the priority, the arbitration circuit 24, 25 and 26. As shown in the view, the arbiter according to the present embodiment is an arbitration apparatus having a tree structure.

The arbitration apparatuses ARB_00 to ARB_03 performs the arbitration of the bus masters related to the data transfer requests REQ0 to REQ3.

The arbitration circuit 24, 25 and 26 are arbitration circuits with priority, and configure the arbitration circuits of a tree structure.

Namely, when the data transfer requests from the arbitration circuit ARB_02 and the arbitration circuit ARB_03 exist concurrently, the arbitration circuit 24 gives grant to that data transfer circuit ARB_03 by priority. When the data transfer request does not exist from the arbitration circuit ARB_03, it gives grant to the data transfer request from the arbitration circuit ARB_02 by priority.

When the data transfer requests from the arbitration circuit ARB_00 and the arbitration circuit ARB_01 exist concurrently, the arbitration circuit 25 gives grant to that data transfer circuit ARB_01 by priority. When the data transfer request does not exist from the arbitration circuit ARB_01, it gives grant to the data transfer request from the arbitration circuit ARB_00 by priority.

The arbitration circuit 26 arbitrates the data transfer request from the arbitration circuit 24 by priority.

By having the above configuration, the arbiter according to the present embodiment arbitrates the data transfer request according to the priority level. As a result, even when the data transfer requests for each bus master are various, arbitrating the data transfer request becomes possible based on the common indicator as the priority level.

<Twelfth Embodiment>

Hereinafter, it will be described about a twelfth embodiment of the present invention.

Figure 15:
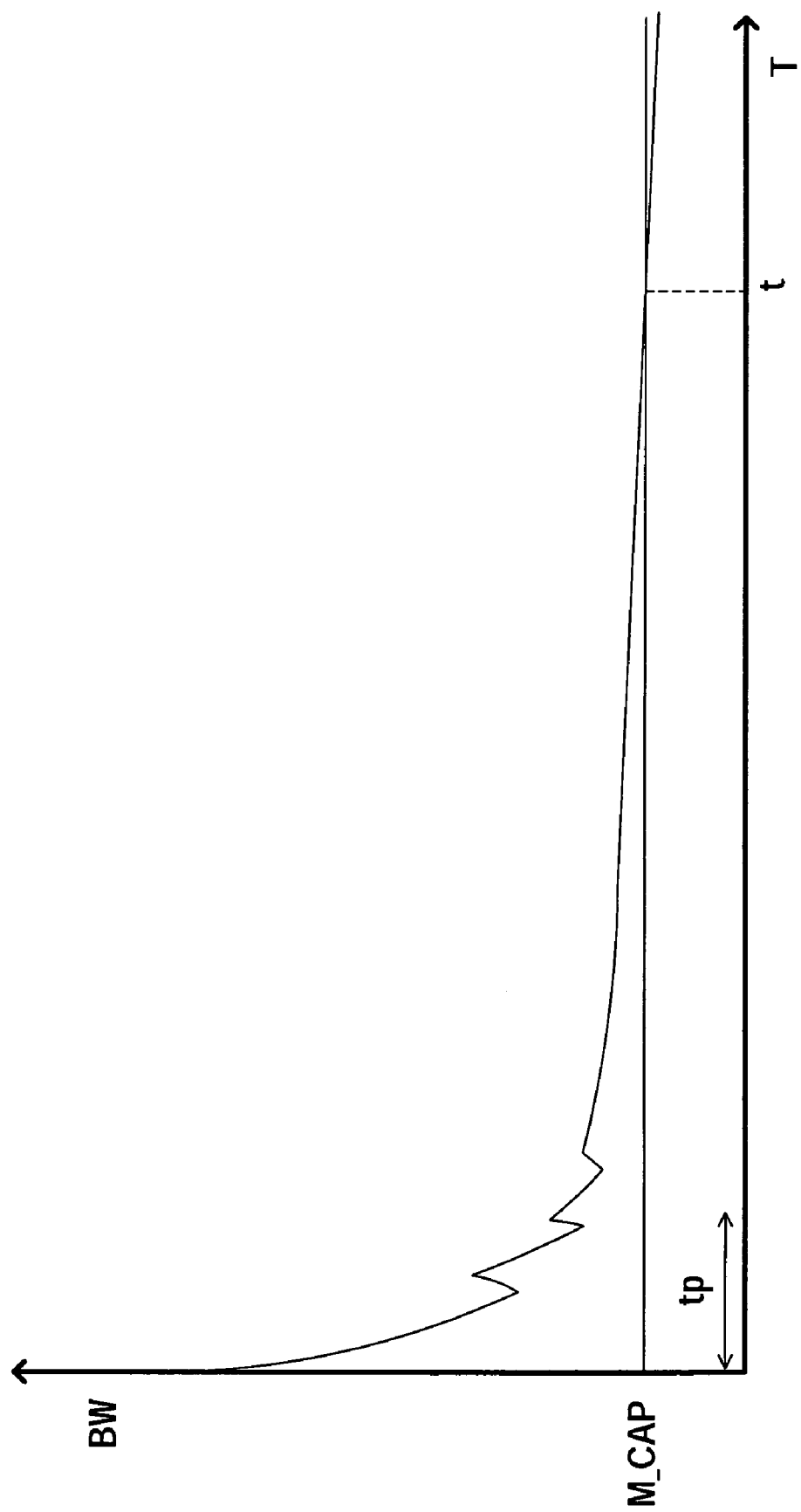
FIG. 15 is a view showing a relationship of capability of a bus width and a memory controller in a case that a bus use request of each bus master is centered.

About the arbitration of the memory bus, when the bus use request (REQ) of each bus master is centered, between from the time point that it is centered until the bus use request is averaged sufficiently, the request exceeds the capability of the memory controller completely. Namely, as shown in FIG. 15, as a result that the bus use request is centered between a extremely short time tp, the band width BW related to the request exceeds the capability of the memory controller (M_CAP: processable amount of the data) until reaching the time t.

In particular, the local increase of the band width BW becomes remarkable when the bus use request of each bus master is not constant and has a fluctuation.

When responding for a fluctuation of the request density of the whole bus masters and a fluctuation of the request density of each bus master by the FIFO buffer, overflow/underflow of the FIFO buffer falls if the adequate arbitration is performed, even when the adequate FIFO buffer capacity is provided.

For example, when a rotating arbitration such as a token ring method is performed by the identical ratio, until the bus use request interval of each bus master and a rate of the rotating arbitration and so on are suitable, even if the FIFO buffer capacity is enough for a fluctuation of the fluctuation of the request frequency of the whole bus master, the bus master that an occupation ratio is high is arbitrated quickly more than necessary and the bus master that the occupation ratio is low may be failed.

Therefore, in the data processing apparatus according to the present embodiment, the adequate arbitration in response to the rate of the band width of each bus master is performed by having a plurality of the request signals and the arbitration circuit of a tree structure.

Therefore, in the data processing apparatus according to the present embodiment, each bus master has a number of request signals in response to the amount of the data of the FIFO buffer. Note that, the request signal may correspond to, for example, the request time of the data transfer.

A circuit configuration of the data processing apparatus according to the present embodiment is realized by the multi-hierarchy arbitration circuit shown in FIG. 14. Then, the priority is decided based on the request signal and the request having the high priority is arbitrated by the arbitration circuit of the higher hierarchy.

Therefore, even when the rate of the band width by one hierarchy arbitration is not adequate, as a result that the bus master the overflow/underflow approaches is arbitrated by priority with the higher hierarchy arbitration circuit, the rate of the arbitration becomes adequate for the rate of the band width.

Further, even when the bus master exceeding one hierarchy becomes plural, the two hierarchy arbitration becomes to be performed, and the adequate arbitration can be performed, as a result that the bus master that the overflow/underflow approaches further is arbitrated by priority with the higher hierarchy arbitration circuit, the rate of the arbitration becomes adequate for the rate of the band width.

Namely, it is not necessary to heed the rate of the arbitration until the highest hierarchy. When providing hierarchies in the request signal and the arbitration of each bus master sufficiently so that two or more bus masters do not accesses to the arbitration circuit of the highest hierarchy at the same time, the adequate rate of the arbitration can be realized constantly.

Further, when not the amount of the data in the FIFO buffer but the time that the data is read out from the FIFO buffer actually can be predicted, it becomes the more preferable configuration by changing the priority of the priority of the request signal in response to the cycle number corresponding to that time.

<Thirteenth Embodiment>

Hereinafter, it will be described about a thirteenth embodiment of the present invention.

Generally, in the transfer request of the data stepping over a row address of the memory and a bank, the data transfer request that the read processing, the write processing and so on switch and so on, there is a case that the interval time arises between the transfer and it becomes an inefficient transfer. Therefore, for example, it is desirable that only the data transfer for read is requested all at once or only the data transfer for write is requested all at once in a point of the transfer efficiency.

However, since the FIFO buffer may fail when emphasizing the transfer efficiency too much, the arbiter is configured with emphasizing the transfer efficiency as possible in a range that the FIFO buffer does not fail.

Consequently, an arbiter according to the present embodiment emphasizes the transfer efficiency, changes the request signal for every kind of the data transfer, raises the priority level of the data transfer that should be given priority in a point of the transfer efficient based on the previous data transfer and arbitrates. Namely, in the low hierarchy that the possibility of the failure of the FIFO buffer is small, the arbitration depending on the transfer efficiency, and when the possibility of the failure in the FIFO buffer arises, the priority arbitration is performed in response to the rate of the amount of the FIFO buffer in the higher hierarchy.

Figure 16:
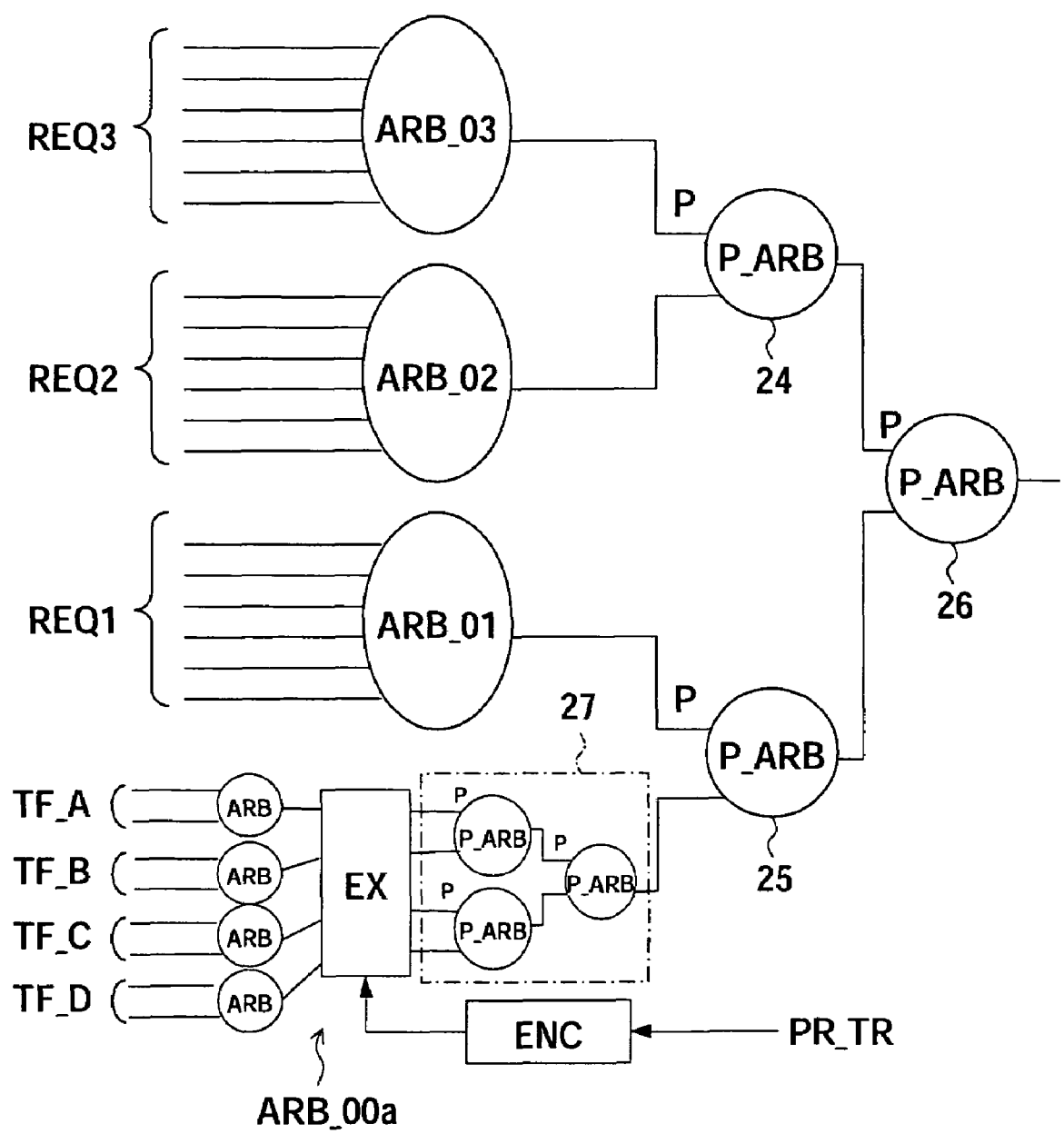
FIG. 16 is a view showing a configuration of an arbiter performing arbitration by a transfer mode in an arbitration circuit of the lowest hierarchy.

FIG. 16 is an example showing a configuration of the arbiter according to the present embodiment.

FIG. 16 differs In comparison with the arbiter described by referring to FIG. 14 in only the lowest hierarchy arbitration circuit. Then, the lowest hierarchy arbitration circuit is characterized that the arbitration is performed based on not the priority decided by the bus master but the transfer mode.

In FIG. 16, the lowest hierarchy arbitration circuit ARB_00a has a configuration enabling to adjust the priority level of the arbitration arbitrarily by the connection exchange circuit EX for different transfer modes TF_A, TF_B, TF_C and TF_D.

Namely, as shown in a view, the arbitration circuit ARB_00a includes an arbitration circuit group 27 configured by three arbitration circuits with priority having tree structures and performs the arbitration in response to the priority. Therefore, by exchanging a connection state by the connection exchange circuit EX, it can become possible to change the priority level of the arbitration in response to the transfer mode.

Note that, the transfer mode is referred to as kinds of the data transfer typified by the data transfer by read or the data transfer by write and so on, however, not sticking for this, the transfer mode includes a kind of the data transfer influencing the transfer efficiency such as a state of the memory circuit.

The encoder ENC supplies a signal that the previous data transfer information PR_TR is encoded to the connection exchange circuit EX. As a result, the priority level of the arbitration is adjusted.

Figure 17:
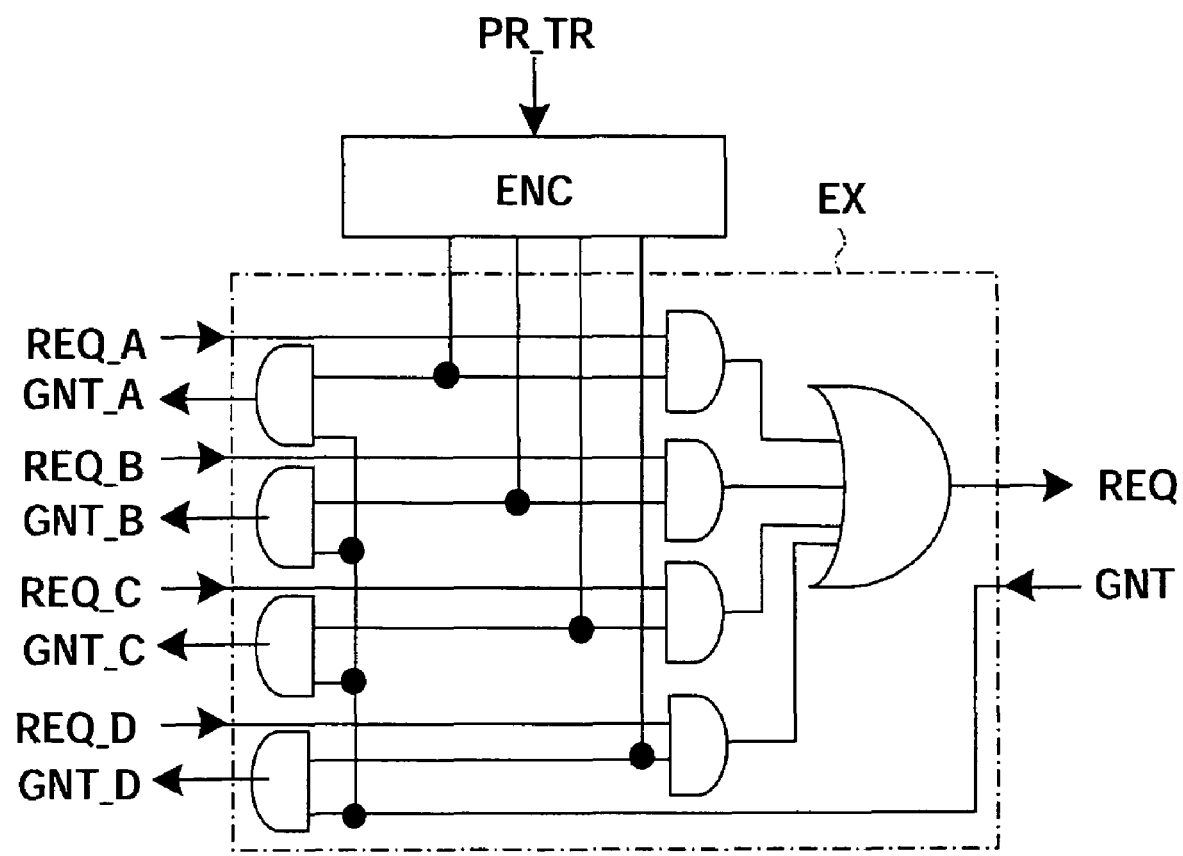
FIG. 17 is a circuit diagram showing a configuration example of a connection exchange circuit EX.

FIG. 17 is a circuit diagram showing a configuration example of the connection exchange circuit EX.

In FIG. 17, REQ_A, REQ_B, REQ_C and REQ_D are transfer request signals from the transfer TF_A, TF_B, TF_C and TF_D, and GNT_A, GNT_B, GNT_C and GNT_D are transfer grant signals for the transfer TF_A, TF_B, TF_C and TF_D respectively.

For example, the connection exchange circuit EX outputs only one transfer request signal as REQ (H level) for the inputted transfer request signals REQ_A, REQ_B, REQ_C and REQ_D based on the signal from the encoder ENC.

Actually, the connection exchange circuit EX shown in FIG. 17 is arranged by number of the wire connection connected to the end of the tree structures of the arbitration circuit group 27 (in an example shown in FIG. 16, 4) and configured so that an arbitrary transfer grant signal is outputted from among the transfer request signals REQ_A, REQ_B, REQ_C and REQ_D.

About the transfer grant signal, in a similar way, the connection exchange circuit EX is configured so that the transfer grant signal (GNT) for the arbitration circuit group 27 is outputted from among the transfer grant signals GNT_A, GNT_B, GNT_C and GNT_D based on the signal from the encoder ENC.

Note that, in FIG. 16, since number of the different transfer mode is 4, the arbitration circuit group 27 is defined as a configuration having three arbitration circuits with priority, however, when number of the transfer mode increases, it is possible to respond by increasing number of the arbitration circuits with priority configuring the tree structures of the arbitration circuit group 27. At that time, an AND circuit of the connection exchange circuit EX shown in FIG. 17 is necessary to be increased in parallel in response to number of the transfer mode.

<Fourteenth Embodiment>

Hereinafter, it will be described about a fourteenth embodiment of the present embodiment.

The most adequate method as a decision of the priority level for the data transfer request from each bus master in the arbitration is a method that the time that the overflow/underflow arises is compared for the corresponding FIFO buffer and the data transfer request (bus use request) from the bus master corresponding to the FIFO buffer that the overflow/underflow arises the earliest is given priority.

Generally, there is a case that it is difficult to predict the time that the overflow/underflow arises for each request of each bus master; however, the arbiter according to the present embodiment solves the complexity in comparing that time in the case that the time that the overflow/underflow arises for each request of each bus master can be predicted.

Meanwhile, unless the cycle number necessary for the arbitration is number of a cycle taken for a memory access of one unit (data transfer cycle) or less, it is possible that the cycle necessary for arbitration becomes critical, and the transfer efficiency descends for waiting for the arbitration.

Correspondingly, for example, when the average value of the cycle number necessary for the arbitration is less than the data transfer cycle number, it can be considered about a method of preventing that the cycle taken for the arbitration becomes critical by storing the bus use request in a QUE when necessary. In that case, however, it suffers from a disadvantage that it becomes difficult to respond when a command to reject the data transfer itself is given from the bus master, and when the bus use request to the effect that the data transfer should be performed immediately is given suddenly.

On the contrary, for arranging a lot of comparison circuit to perform the arbitration by a constant cycle, a circuit scale becomes enormous when a number of bus masters are necessary.

Consequently, the arbiter according to the present embodiment compares the time itself that the overflow/underflow is generated unless the bus use request of the writing/reading is processed in the cycle taken for a transfer unit and decides the priority level of the bus use request from each bus master when the writing/reading of the data for the FIFO buffer of the bus master performs a simple operation such as an operation as same as the prediction and the access of the memory bus defines the data transfer cycle to be a constant length for improving the efficiency.

Figure 18:
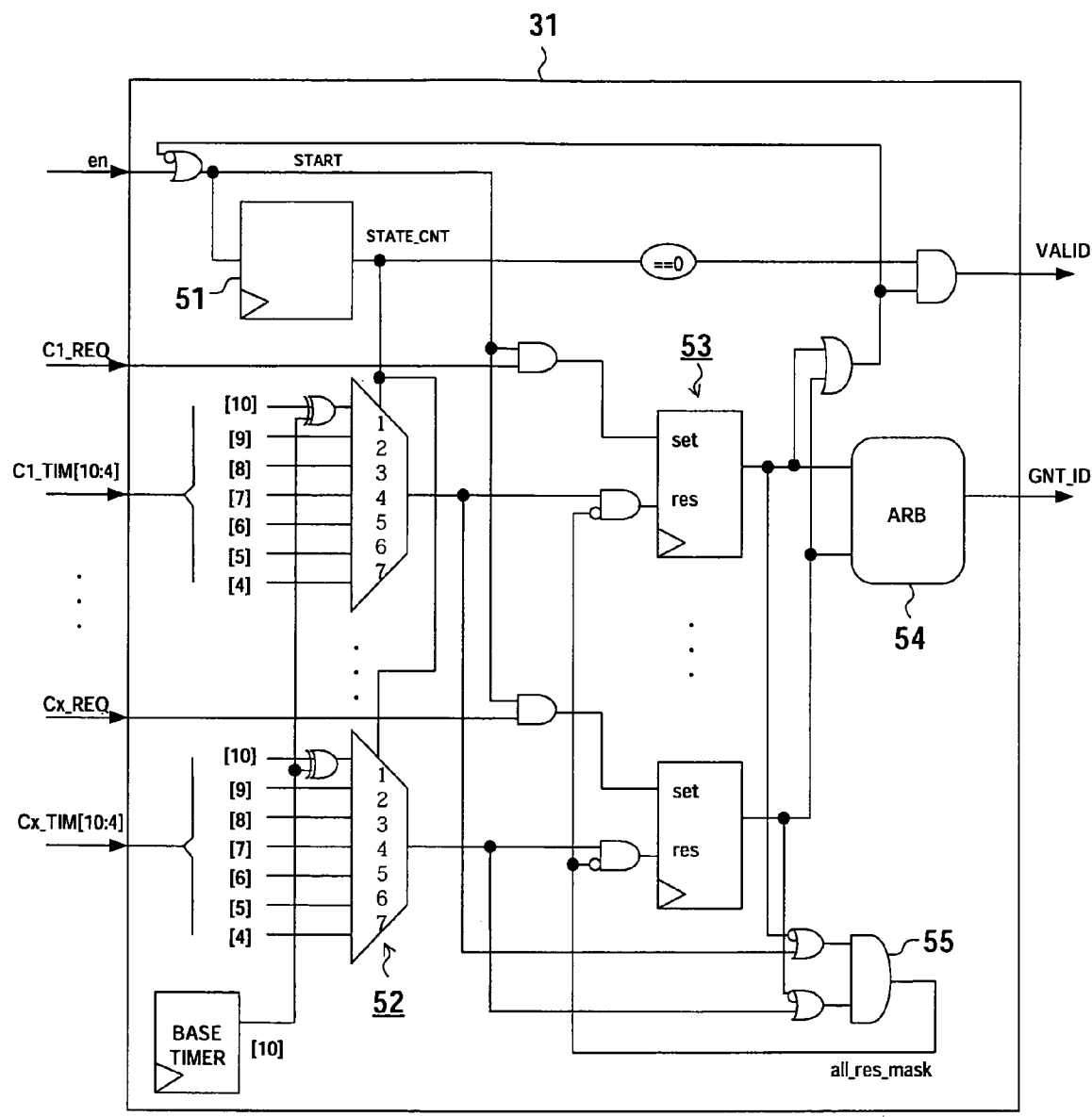
FIG. 18 is a circuit diagram showing an example showing a configuration of a time arbitration circuit.

FIG. 18 is a circuit example showing a configuration of a time arbitration circuit 31 included in the arbiter according to the present embodiment.

The time arbitration circuit 31 exemplifies the case that one unit if the access (data transfer cycle) is defined as eight cycles or more and the arbitration is performed in eight cycles that is the cycle number necessary for the arbitration or less. Further, the generation of the overflow/underflow is assumed 2047 cycles or less, and the timer is configured to be 11 bits.

As shown in FIG. 18, the time arbitration circuit 31 inputs an enable signal en, request signals Cx_REQ from a plurality of the bus masters (1 to x) and time until the overflow/underflow is generated Cx_TIM ([10:4] means as a data of the higher seven bits), and outputs a grant ID (GNT_ID) that is an ID of the bus master that grants the data transfer.

FIGS. 19A to 19F are timing charts showing the time arbitration circuit 31. FIG. 19A shows a timing of a clock signal CLOCK, FIG. 19B shows an output if a start pulse START, FIG. 19C shows a count value STATE_CNT of a counter 51, FIG. 19D shows a request time of bus masters C1 to C6, FIG. 19E shows outputs of S/R latch group 53 of each bus master and FIG. 19F shows an output all_res_mask of an AND circuit 55.

Hereinafter, an operation of the time arbitration circuit 31 according to the present embodiment will be described as being related to FIG. 18 and FIGS. 19A to 19F.

As shown in FIG. 19B, the start pulse START starts in synchronization with the timing of the start of the clock signal CLOCK by the enable signal en from the external, a count is started by the counter 51, and the counter 51 outputs the counter value STATE_CNT (FIG. 19C).

The counter 51 is configured by, for example, the timer of three bits, when the count value STATE_CNT outputs "0" after outputting "1" to "7", the time arbitration circuit 31 outputs a VALID signal showing that a comparison of the request time of each bus master is ended.

In the counter group 52, the request time for every bus master C1 to C6, namely, the time information C1_TIM[10:4] to C6_TIM[10:4] that is the higher seven bits showing the time that the overflow/underflow of the FIFO buffer is generated is inputted as shown in FIG. 19D.

The inputted request time for each bus master is supplied to each S/R latch of the S/R latch group 53 by one bit from the higher bits sequentially.

The S/R latch group 53 has a plurality of S/R latches in response to number of the bus masters, each S/R latch is all set ("1") by the start pulse and the request signals Cx_REQ (x: 1 to 6) in the primary time t1.

When a bit outputted from a certain counter of the counter group 52 is "1" and the other counter outputting a bit "0" exists, the corresponding S/R latch is reset ("0"). This is because the request time of the bus master corresponding to the counter is longer than the request time of the other bus master, and the priority level of the bus use request of that is low.

For example, in the time t2 shown in FIG. 19E, since the highest bit of the bus master C1 is "1" and the highest bit of the all other bus master is "0", the other counter outputting "0", the S/R latch corresponding to the bus master C1 is reset ("0"). In a similar way, in the time t3 shown in FIG. 19E, since a second bit from the highest of the bus master C2 is "1", a second bit from the highest of the other bus masters is "0", the other counter outputting a bit "0" and the S/R latch corresponding to the bus master is reset ("0").

In the time arbitration circuit 31 shown in FIGS. 19A to 19F, when it is reset once on the time arbitration, it is not set after that.

Note that, as mentioned above, in making the S/R latch group 53 to operate, when the S/R latch of all the bus masters that are the objects of a comparison of the outputted bits is set "1", the all_res_mask is set ("1") by the AND circuit 55.

For example, in the time t4 shown in FIG. 19D, bits from the highest to fourth of the bus masters C3 to C6 that are comparison objects of the outputted bit are all "1", all_res_mask is set ("1") by the AND circuit 55. As a result, it is avoided that the S/R latch corresponding to the above bus master are all reset ("0").

Namely, when the outputted bits are equivalent in all the bus masters, since relative merits by the request time can be defined, processing is not performed at the outputted bit and processing is performed based on the next outputted bit.

As mentioned above, when the S/R latch group 53 operates, and the time arbitration is ended at the time t8, the arbitration circuit (ARB) 54 arbitrates a bus master corresponding to the set ("1") S/R latch in the S/R latch group 53 as an object and outputs a grant ID (GNT_ID) as an arbitration result.

Namely, the bus master corresponding to the set ("1") S/R latch is a bus master that the overflow/underflow is generated the most quickly and the access for the bus is granted by selecting one bus master among them.

As mentioned above, the arbiter according to the present embodiment can compare the time itself that the overflow/underflow is generated unless the bus use request of the writing/reading is processed in the cycle taken for a transfer unit and can decide the priority level of the bus use request from each bus master when the writing/reading of the data for the FIFO buffer of the bus master performs a simple operation such as an operation as same as the prediction and the access of the memory bus defines the data transfer cycle to be a constant length for improving the efficiency with a simple configuration.

Further, since the arbiter according to the present embodiment is configured so that the time arbitration is ended in the data transfer cycle, the time for arbitration does not exceed the data transfer cycle and does not become critical.

<Fifteenth Embodiment>

Hereinafter, it will be described about a fifteenth embodiment of the present invention.

A data processing apparatus according to the present embodiment is a bus system to reduce a chip area by arranging a common buffer in the center, reducing the capacity of the FIFO buffer that each bus master has in the past and reducing the FIFO buffer capacity that is nonuse/unnecessary for every mode of the whole chips.

Figure 20:
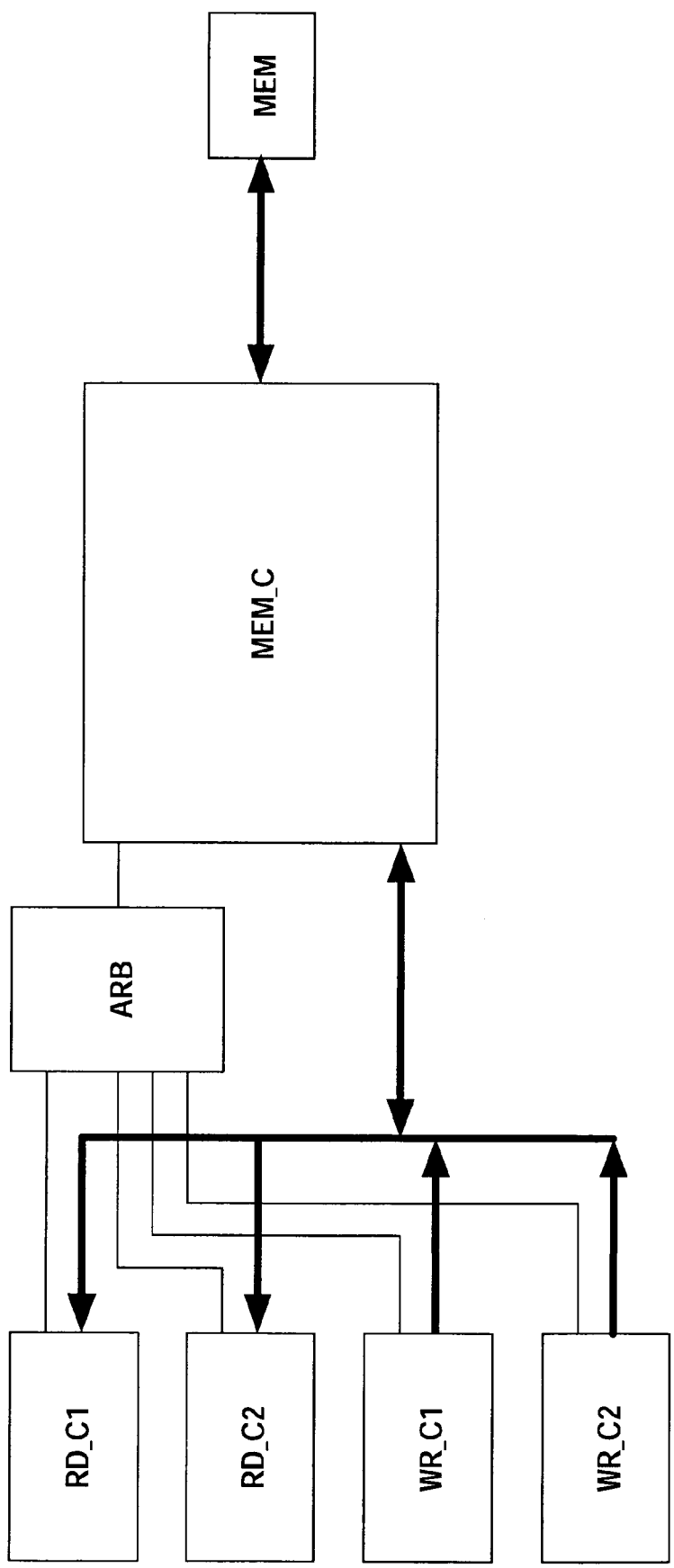
FIG. 20 is a view showing an example of a peripheral circuit configuration that a related arbiter is applied.

FIG. 20 is an example showing a configuration of the peripheral circuit that the arbiter (ARB) in the past is applied. In the view, the data transfer requests from bus masters RD_C1 and RD_C2 performing the read processing and bus masters WR_C1 and WR_C2 are arbitrated by the arbiter (ARB), and the data transfer is performed between an external memory via the memory controller (MEM_C). At that time, each bus master has the FIFO buffer which does not fail between from the data transfer is granted until the data transfer is actually performed.

Generally, the capacity of the FIFO buffer is estimated in consideration of the worst value of the latency from the time that the bus use request should be performed (for example, the time that the FIFO buffer becomes just empty if the data transfer request is granted in write processing) until the data is read and written in the FIFO buffer.

On the contrary, the waiting time of the arbitration increases substantially with an increase of number of the bus master in the recent years. Further, when seeing a spec pf a DDR_SDRAM, one unit burst length an efficient memory access increases, as a result, the above-mentioned latency becomes larger. Further, the bus width of the memory bus tends to become larger. Therefore, in consideration of the worst value of the latency, the capacity if the FIFO buffer that each bus mater should have increases dramatically.

Further, number, kind and band width of the bus master tend to be different for every system mode remarkably by increase of the bus master and diversification of an operation system modes in one chip. Therefore, the FIFO buffer may not be operated and may not be wasted in a certain mode.

Further, for a certain bus master, the FIFO buffer capacity is decided based on the maximum band width, the decided capacity may not be used in most modes, the FIFO buffer capacity may be wasted.

On the contrary, when configuring the FIFO buffer capacity given to each bus master is switched for every system mode, it can be solved a disadvantage that the FIFO buffer becomes wasted in a certain system mode. However, it is usually difficult to define the timing to switch the FIFO buffer when the system operation changes, further, it suffers from a disadvantage that the configuration may become remarkably complex when changing the FIFO buffer capacity by the software for every system mode.

Consequently, an arbiter according to the present embodiment is characterized that the unnecessary FIFO buffer capacity that each bus master has had in the past is reduced by having a large common buffer (center buffer) in the center and performing a flexible arbitration. Namely, the arbiter according to the present embodiment enables to adjust automatically the ratio that each bus master uses the center buffer, reduces the FIFO buffer capacity in the whole system and realizes downsizing of the chip area.

Figure 21:
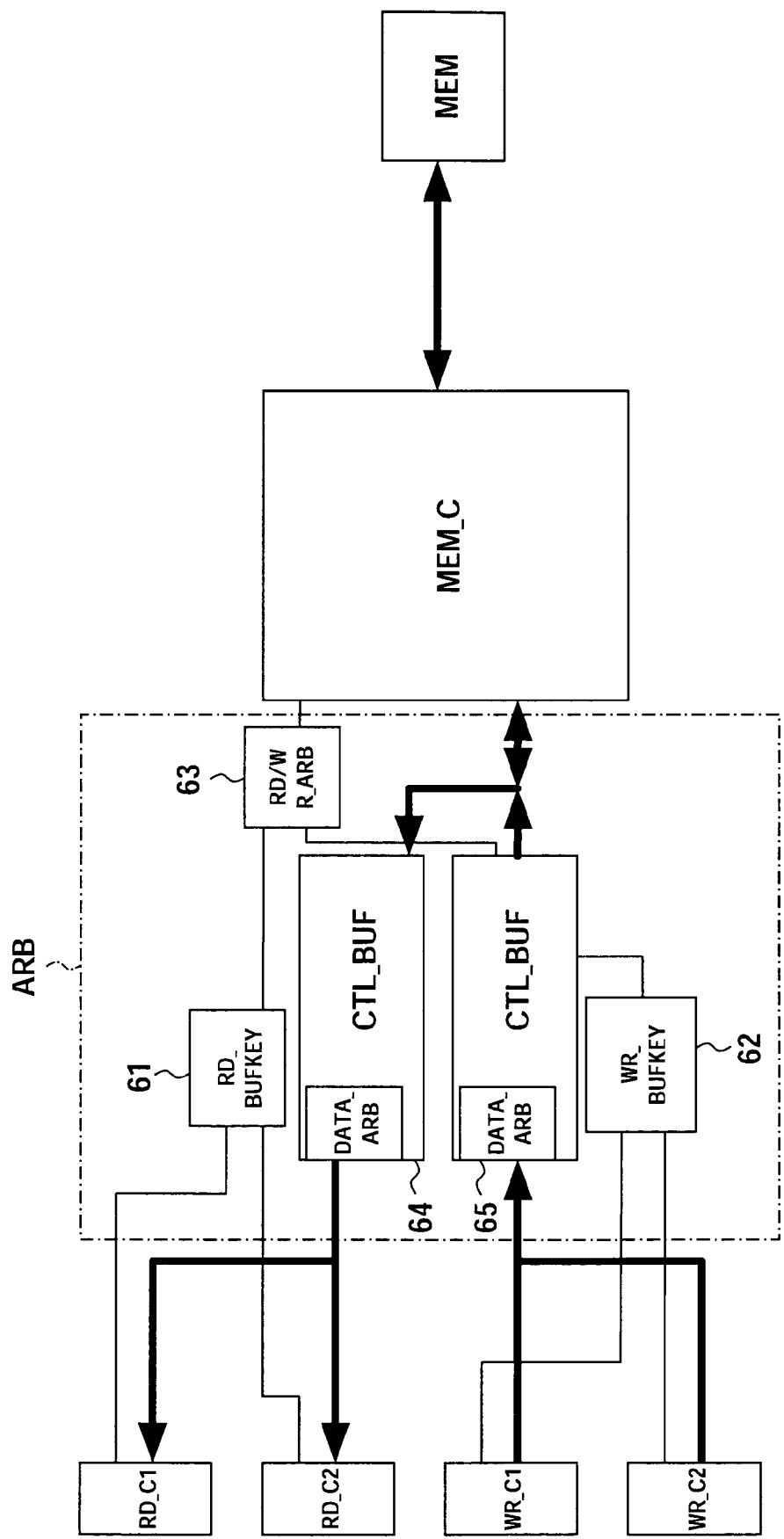
FIG. 21 is a view showing an example of a configuration example of an arbiter having a center buffer.

FIG. 21 is an example showing a configuration of the arbiter (ARB) according to the present embodiment.

The arbiter according to the present embodiment has two buffers of a read use center buffer (CTL_BUF) 64 and a write use center buffer (CTL_BUF) 65 and in each center buffer, the data storage area is managed by a key.

Then, bus masters RE_C1 and RD_C2 performing the read processing and bus masters WR_C1 and WR_C2 performing the write processing perform the requests for obtaining the key corresponding to the vacant area of the center buffer with the information of the data request time for a read use buffer key arbitration circuit 61 (RD_BUFKEY) and a write use buffer key arbitration circuit 62 (WR_BUFKEY) respectively.

In each buffer key arbitration circuit, for example, the time arbitration described by referring to FIG. 18 is performed by the time arbitration circuit 31 and the request of the bus master related to the data transfer that should be processed the most quickly is selected based on the information of the data request time given from each bus master.

Further, for example, when there is the vacant area in a read use center buffer 64, the read use buffer key arbitration circuit 61 performs the data transfer request with the information such as a memory address related to the selected data transfer request and a key of the vacant area of the read use center buffer 64 for a read/write arbitration circuit 63.

The read/write arbitration circuit 63 (RE/WR_ARB) arbitrates the data transfer request from the read use buffer key circuit 61 and the data transfer circuit from the write use buffer key arbitration circuit 62 and selects either of the request.

At that time, since the transfer efficiency is impaired in switching reading and writing, for example, when write use center buffer 65 is stored at a certain degree and when the request from the read use buffer key arbitration circuit 61 has disappeared (the read use center buffer 64 is filled), the memory access performs the arbitration such that the request for the write use buffer key arbitration circuit 62 is granted collectively. As a result, an inefficiency operation such as performing the read processing and the write processing alternately can be prevented.

The read use center buffer 64 and the write use center buffer 65 are managed for a plurality if every data storage area corresponding to the key.

For example, as a result of the arbitration by the read use buffer key arbitration circuit 61, the bus master that the key is given takes the data at the predetermined time from the data storage area corresponding to the given key in the read use center buffer.

At that time, since a plurality of bus masters take the data, as shown in FIG. 21, the read use center buffer 64 has a data arbitration circuit (DATA_ARB) for arbitrating a plurality of the bus masters. In the similar point of view, the write use center buffer 65 has a data arbitration circuit (DATA_ARB).

Figure 22:
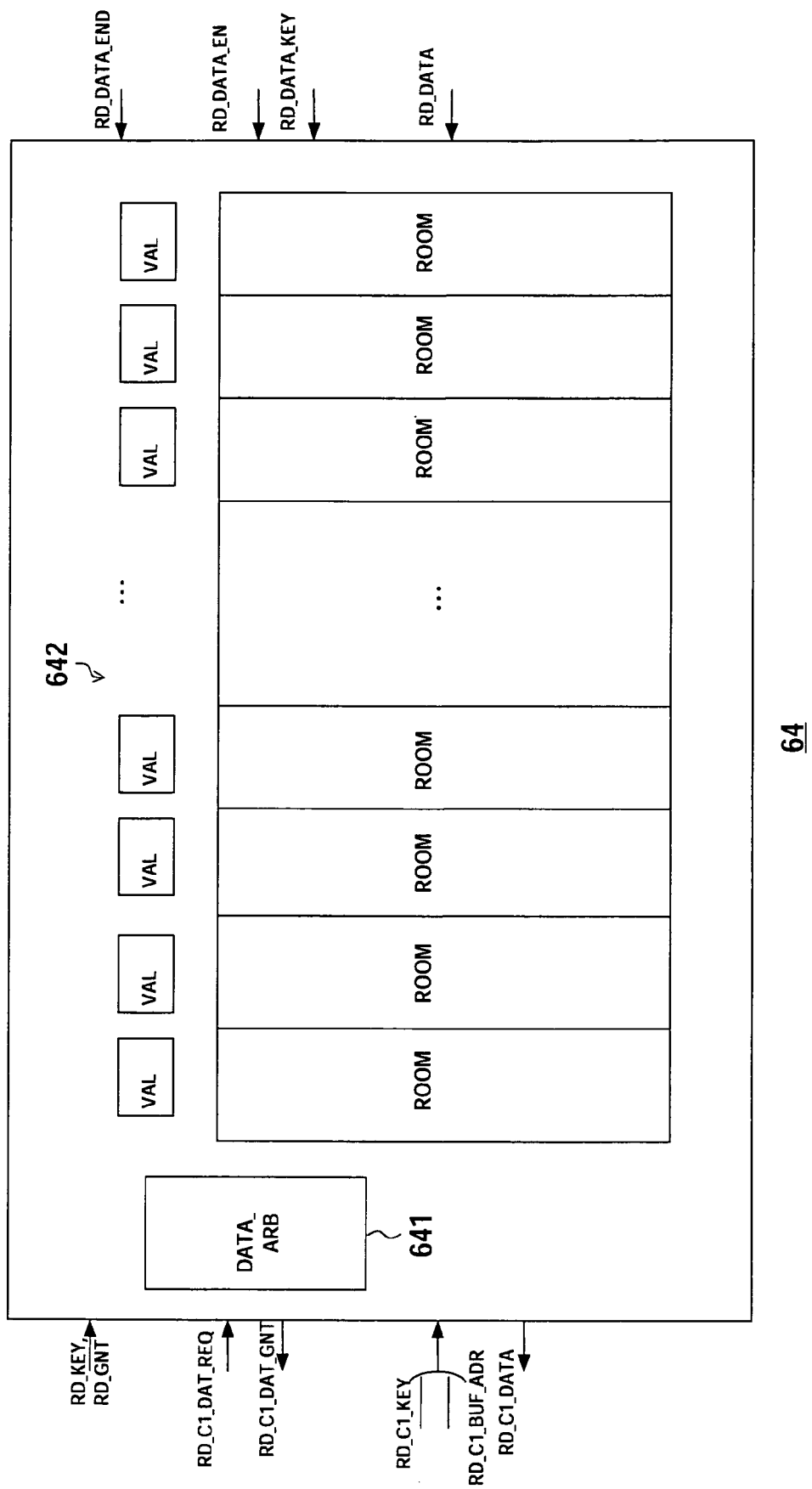
FIG. 22 is a view showing a configuration example of read use center buffer.
Figure 23:
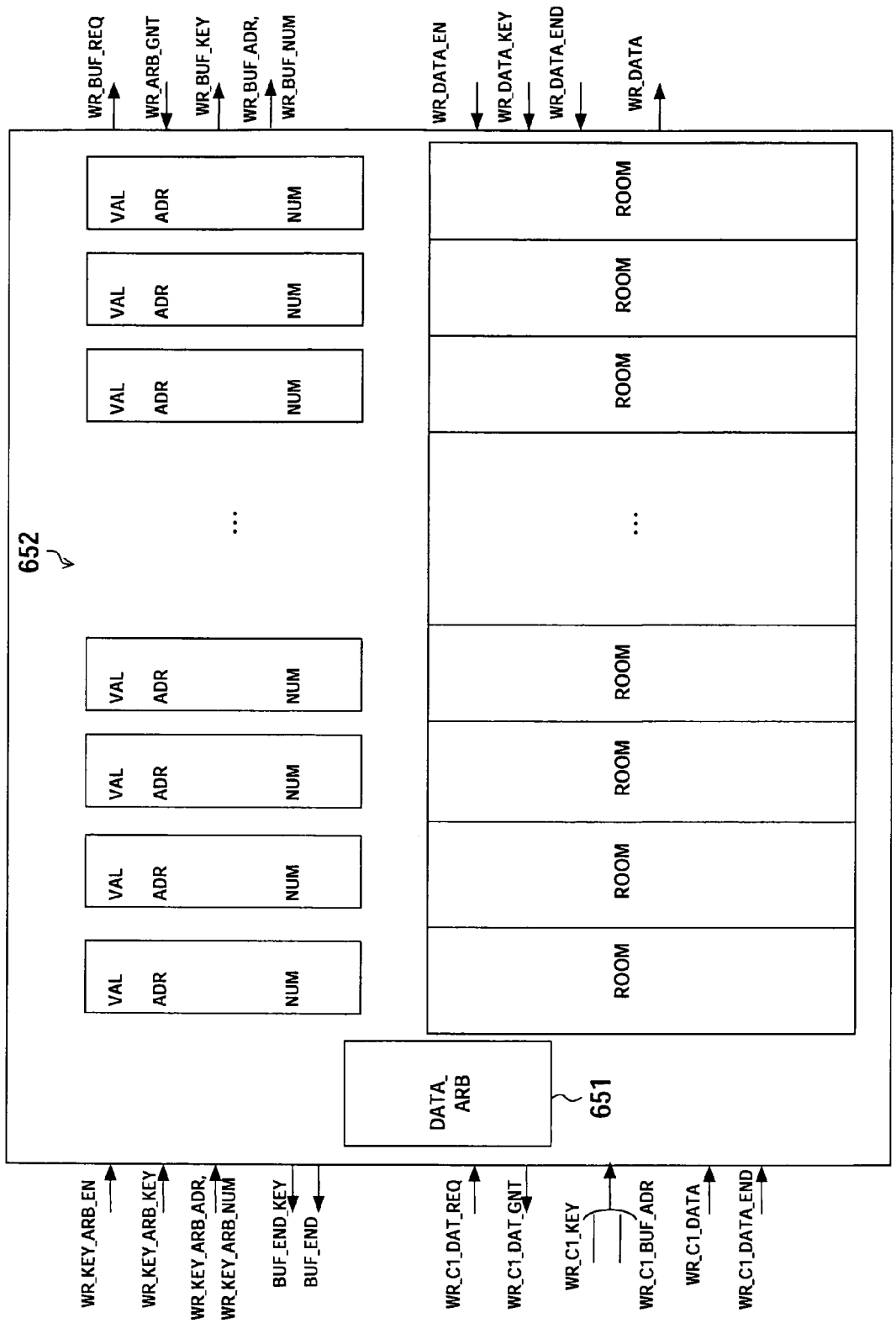
FIG. 23 is a view showing a configuration example of write use center buffer.

The read use center buffer 64 and the write use center buffer 65 are shown in FIG. 22 and FIG. 23 respectively.

As shown in FIG. 22, the read use center buffer 64 has the above-mentioned data arbitration circuit 641 and a data storage unit 642 including VALID (VAL) corresponding to the key and a data storage area (ROOM) corresponding to VAL.

In the contrary, as shown in FIG. 23, the write use center buffer 64 has the above-mentioned data arbitration circuit 651 and a data storage unit 652 including VALID (VAL) corresponding to the key, the address information (ADR), the information of number of the data (NUM) and the data storage area (ROOM).

In the read processing, at the point that the arbitration of the read use buffer key 61 is ended, since a the address information (ADR) and the information of number of data (NUM) is given to each bus master from the memory controller (MEM_C) directly, in the data storage unit 642 of the read use center buffer 64, it is not necessary to hold the address information (ADR) and the information of number of data (NUM) as shown in FIG. 22.

In the write processing, since a delay is generated from the writing request until the writing is performed actually, it is necessary to hold the address information (ADR) and the information of number of data (NUM) corresponding to the buffer key in the case such that two or more buffer key are given to the bus master side. Therefore, as shown in FIG. 23, it is configured that the write use center buffer holds these information.

About the arbiter according to the present embodiment having the above-mentioned configuration, first, it will be described about the read processing.

Figure 24:
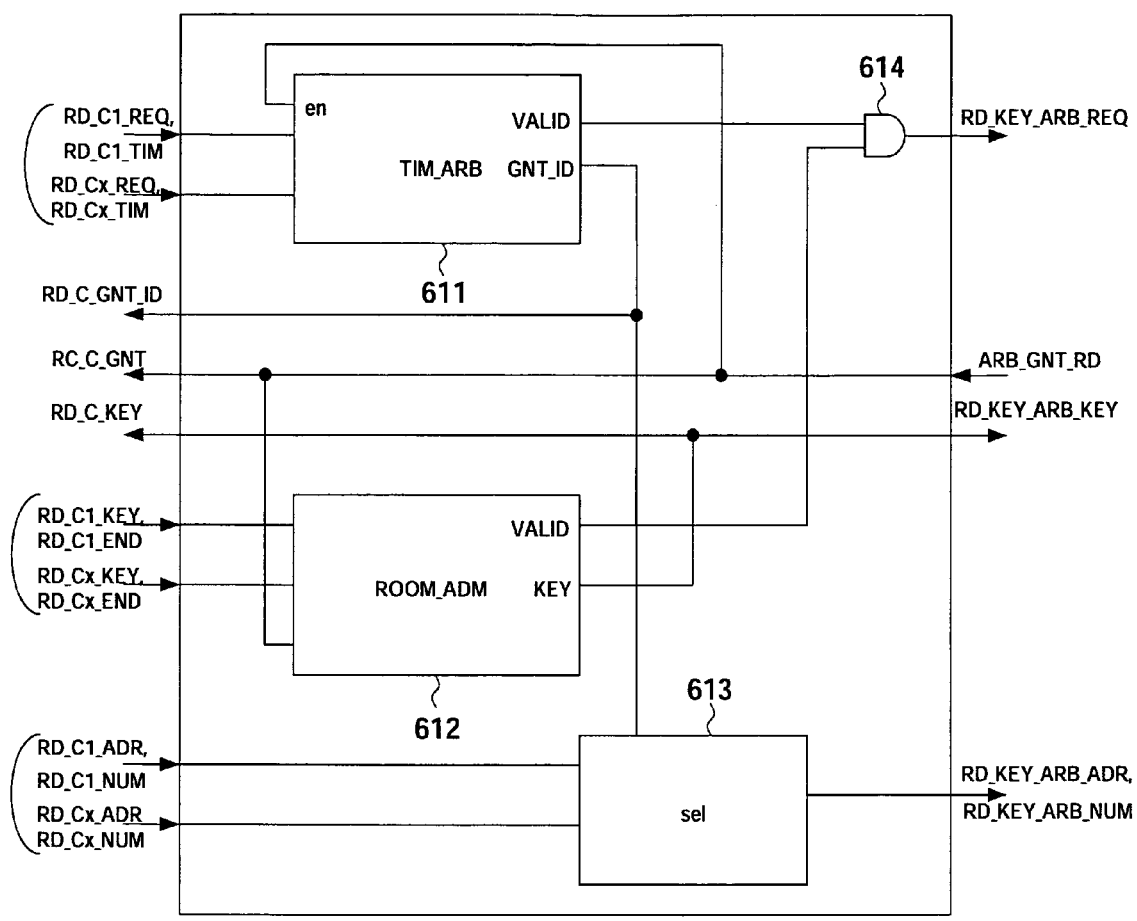
FIG. 24 is a view showing an example of a circuit configuration of a read use buffer key arbitration circuit.

FIG. 24 is an example of a circuit configuration of the read use buffer key arbitration circuit 61.

In FIG. 24, the time arbitration circuit (TIM_ARB) 611 performs the arbitration based on the request signal RD_Cx_REQ and the request time RD_Cx_TIM (the time until the FIFO buffer falls into underflow) from a plurality of read use bus masters. Namely, the time arbitration circuit 611 arbitrates to select a bus master that the request time RD_Cx_TIM is the shortest and outputs GNT_ID that is the arbitration result and VALID (H level) showing that the arbitration is ended correctly.

For example, the time arbitration circuit 31 shown in FIG. 18 can be applied to the time arbitration circuit 611 concretely.

A vacant area administration unit (ROOM_ADM) 612 manages where area of the read use center buffer is a vacant area. When a vacant area exists, it gives a key (RD_KEY_ARB_KEY) corresponding to the vacant area for the bus master arbitrated by the time arbitration circuit 611. This allows the bus master that the key is given to take the data by accessing the data storage area corresponding to the key.

On the contrary, when reading of the data from the read use center buffer 64 and the key is returned (RE_Cx_KEY, RD_C1_END), the key become possible to be given to the other bus master.

Figure 25:
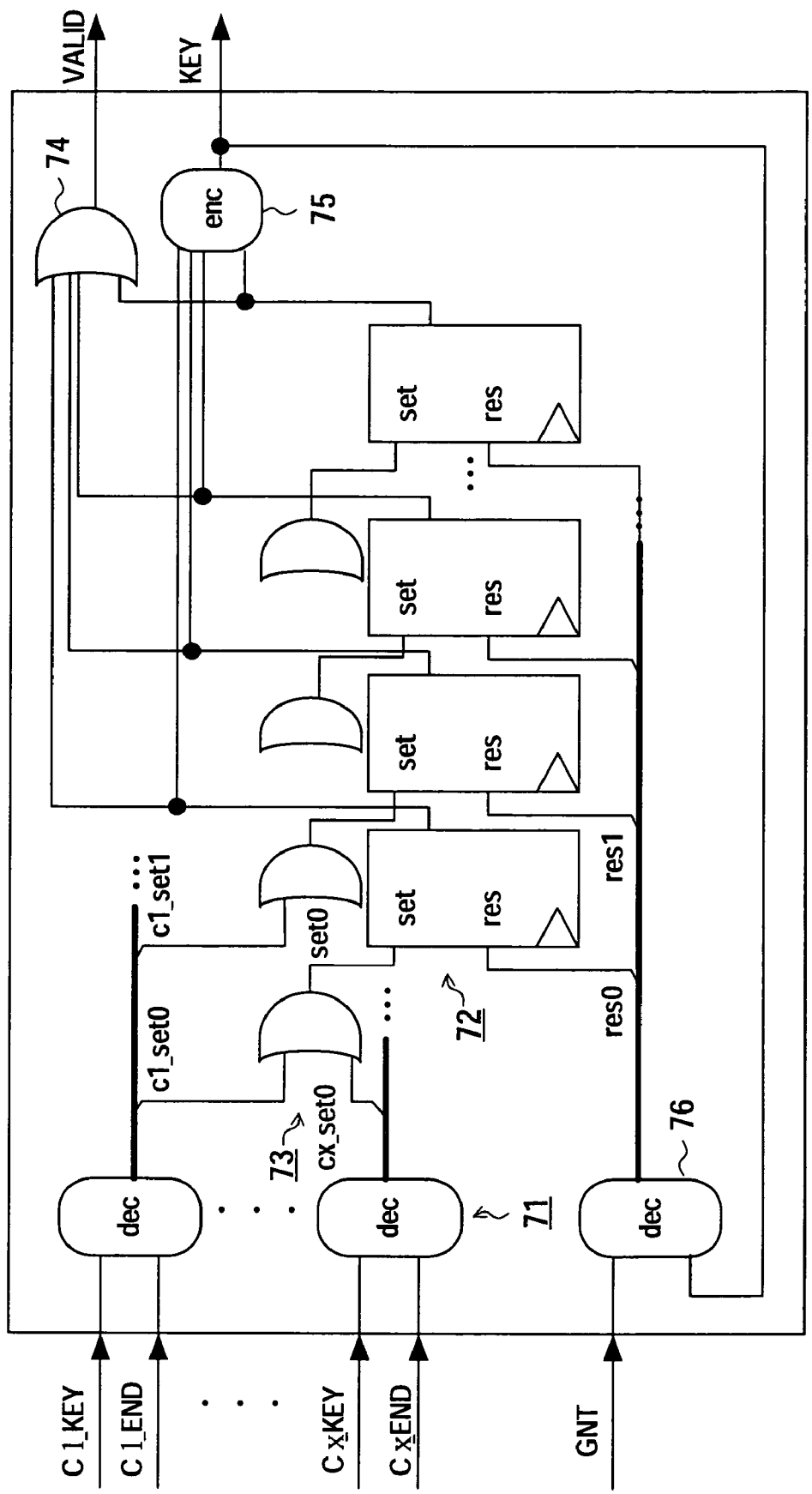
FIG. 25 is a view showing an example of a concrete circuit configuration of a vacant area administration unit.

FIG. 25 is an example of a concrete circuit configuration of the vacant area administration unit 612.

In the circuit example shown in FIG. 25, each S/R latch of an S/R latch group 72 corresponds to the key, an S/E latch able to give a key is set (set). When either one S/R latch is set in the S/R latch group 72, VALID becomes to H level by an OR circuit 74, the corresponding key number is outputted by an encoder 75 and provided to the bus master granted by the time arbitration circuit 611.

When the data transfer request is granted, the S/R latch corresponding to the key provided to the bus master is reset (res) via a decoder 76 by GNT from the read/write arbitration circuit. As a result, the same key is not provided to the other bus master.

On the contrary, the key is returned from the bus master (Cx_KEY, Cx_END), the S/R latch is set (set) by a decoder group 71 and an OR circuit group 73. As a result, it becomes a state possible to give the key to the other bus master.

A selection circuit (sel) 613 inputs the address information (ADR) and the information of number of data (NUM) related to the data transfer from each bus master, selects the address information (RD_KEY_ARB_ADR) and the information of number of data (RD_KEY_ARB_NUM) arbitrated by the time arbitration circuit 611 and sends it to the read/write arbitration circuit 63.

The AND circuit 614 sends the request signal (RD_KEY_ARB_REQ) for the vacant area unless VALID from the time arbitration circuits 611 and 612 is H level.

Next, it will be described about an operation of the read processing of the arbiter according to the present embodiment having the above-mentioned configuration by referring a processing flow shown in FIG. 26.

Figure 26:
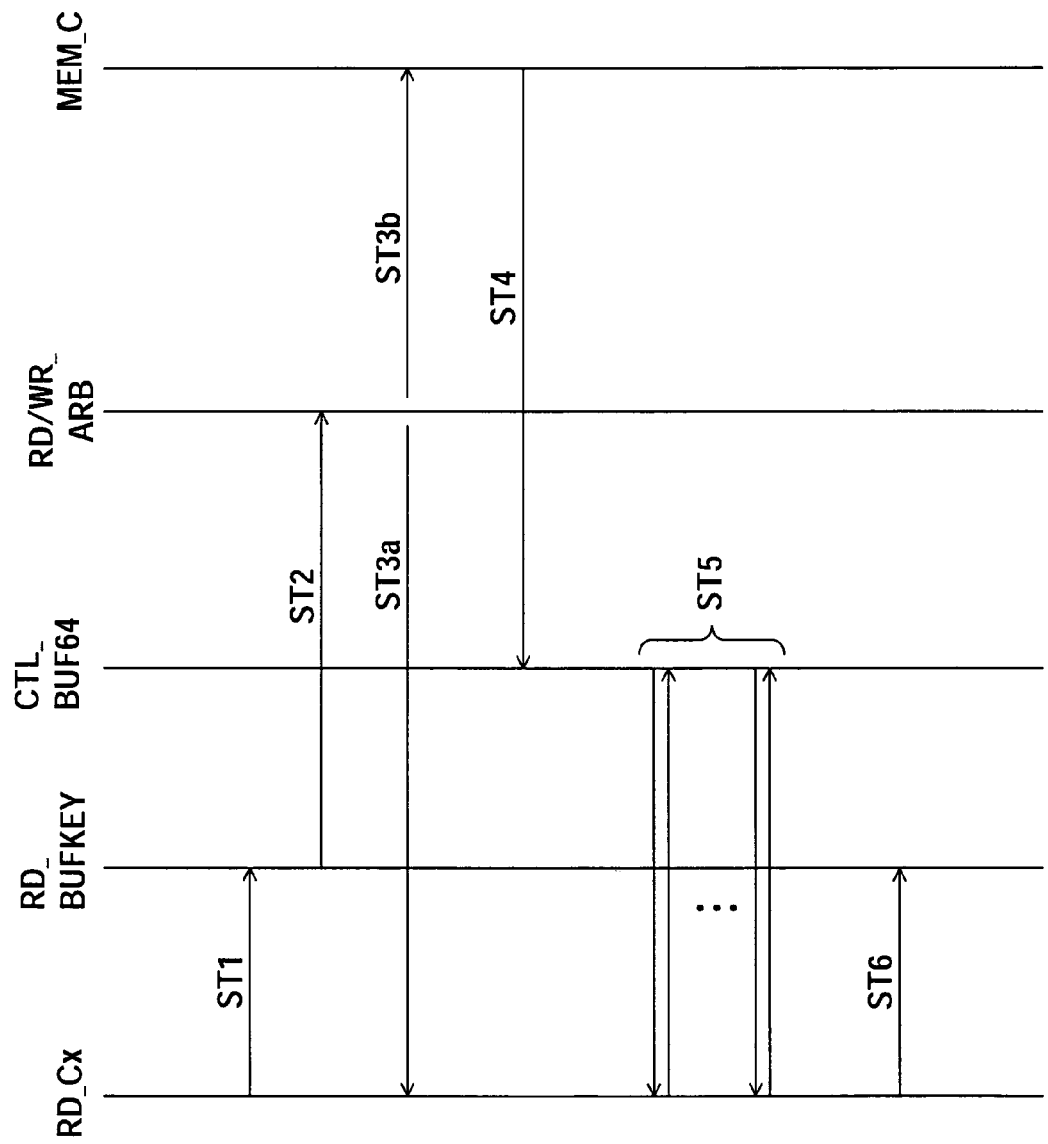
FIG. 26 is an operation flow of read processing of an arbiter related to an embodiment.

First, in a step ST1 of FIG. 26, each bus master RD_Cx sends the request signal Cx_REQ and the request time RD_Cx_TIM for the read use buffer key arbitration circuit (RE_BUFKEY) 61 and requests the data transfer by the write processing.

Further, each bus master RD_Cx supplies the address information (ADR) and the information of number of data (NUM) for the selection circuit 613.

Next, in a step ST2, the read use buffer key arbitration circuit 61 performs the arbitration based on the request time RD_Cx_TIM and selects a bus master needing the data transfer the most quickly. At the same time, when there is a vacant area in the read use center buffer 64, the read use buffer key arbitration circuit 61 gives the request signal for the vacant area (RD_KEY_ARB_REQ), the key number (RD_KEY_ARB_KEY), the address information (ADR) and the information of number of the data (NUM) to the read/write arbitration circuit (RD/WR_ARB) 63.

The selection circuit 613 sends the address information (RD_KEY_ARB_ADR) and the information of number of the data (RD_KEY ARB_NUM) to the read/write arbitration circuit 63.

The read/write arbitration circuit 63 performs the arbitration based on the request from the above-mentioned read side (RD_KEY_ARB_REQ) and the request from the write side. As a result, the inefficient data transfer that the read processing and the write processing are complicated is avoided.

After the arbitration, the read/write arbitration circuit 63 gives the key, the address information (ADR) and the information of number of the data (NUM) given by the read use buffer key arbitration circuit 61 to the memory controller (MEM_C) and the bus master arbitrated by the read use buffer key arbitration circuit 61 (steps ST3a and ST3b). The bus master that the buffer key is received supplies the next request signal Cx_REQ and the next request time RD_Cx_TIM when receiving the next data transfer request. Note that, each bus master is configured to enable to accumulate the necessary amount of the key.

Further, the read/write arbitration circuit 63 reset VALID corresponding to the key of the read use center buffer 64.

In a step ST4, the memory controller (MEM_C) stores the data corresponding to the address information (ADR) and the information of number of the data (NUM) given by the read/write arbitration circuit 63 in the vacant area corresponding to the key number in the read use center buffer 64, at the same time, the memory controller sets VALID (H level).

In a step ST5, the read use center buffer 64 arbitrates the data transfer from the data storage area related to a plurality of the request for every processing cycle. The arbitration is performed by, for example, the rotating arbitration such as the token ring method.

Note that, in that arbitration, while the read data is stored in the read use center buffer 64, the request from the other bus master without having the key is masked when VALID corresponding to the key is set.

In the step ST5, the bus master requests the data transfer with the key for the read use center buffer 64 when a vacancy is generated in the FIFO buffer assigned respectively.

The bus master that taking the data from the data arbitration circuit 641 of the read use center buffer 64 returns the key after taking the data from the data storage area corresponding to the key number (step ST6). Namely, the vacant area administration unit 612 of the read use buffer key arbitration circuit 61 set the S/R latch corresponding to the returned key based on the key return information (RD_Cx_KEY, RD_Cx_END) from the bus master and makes the key enable to use for the bus master of the next read processing.

Next, it will be described about the write processing of the arbiter according to the present embodiment.

Figure 27:
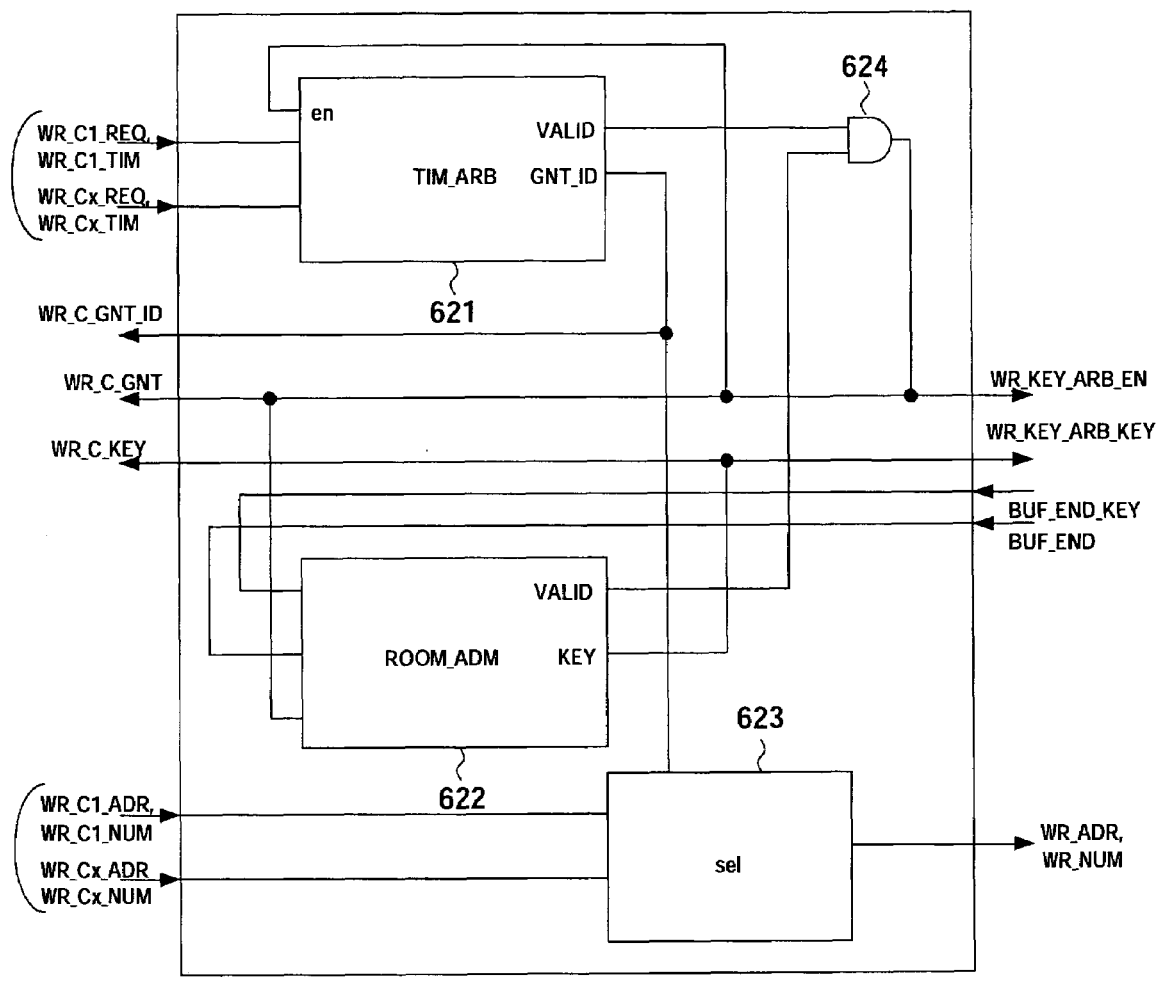
FIG. 27 is a view showing an example of circuit configuration of a write use buffer key arbitration circuit.

FIG. 27 is an example of a circuit configuration of the write use buffer key arbitration circuit 62.

In FIG. 27, the time arbitration circuit 621 performs the arbitration based on the request signal WR_Cx_REQ and the request time WR_Cx_TIM (the time until the FIFO buffer falls into overflow) from a plurality of read use bus masters. Namely, the time arbitration circuit 621 arbitrates to select a bus master that the request time WR_Cx_TIM is the shortest and outputs GNT_ID that is the arbitration result and VALID (H level) showing that the arbitration is ended correctly.

For example, the time arbitration circuit 31 shown in FIG. 18 can be applied to the time arbitration circuit 621 concretely.

A vacant area administration unit (ROOM_ADM) 622 manages that whether or not each data storage area (ROOM) of the write use center buffer 65 is a vacant area (usable), and when a vacant area exists, it gives a key (WR_KEY_ARB_KEY) corresponding to the vacant area for the bus master arbitrated by the time arbitration circuit 621. Concretely, the vacant area administration unit 622 is configured in a way similar to the circuit shown in FIG. 25, when the vacant area exists, a key is given to the bus master arbitrated by the time arbitration circuit 621 and the corresponding S/R latch is reset.

The bus master that the key is given becomes possible to write the data by accessing to the data storage area corresponding to the key, After writing in, the bus master sets a signal showing that the data storage area corresponding to the key is effective.

On the contrary, when the actual writing of the data from the write use center buffer 65 to the memory is ended □the memory controller (MEM_C) returns the key (BUF_END_KEY, BUF_END) and makes possible to give the key to the other bus master by setting the S/R latch corresponding to the vacant area administration unit. Further, a signal indicating that the data storage area corresponding to the key is effective is reset.

A selection circuit (sel) 623 inputs the address information (ADR) and the information of number of data (NUM) related to the data transfer from each bus master, selects the address information (WR_ADR) and the information of number of data (WR_NUM) arbitrated by the time arbitration circuit 621 and sends it to the read/write arbitration circuit 63.

The AND circuit 624 sends the request signal (WR_KEY_ARB_REQ) for the vacant area unless VALID from the time arbitration circuit 621 and the time arbitration circuit 622 is H level.

It will be described about an operation of the write processing of the arbiter according to the present embodiment having the above-mentioned configuration by referring a processing flow shown in FIG. 28.

Figure 28:
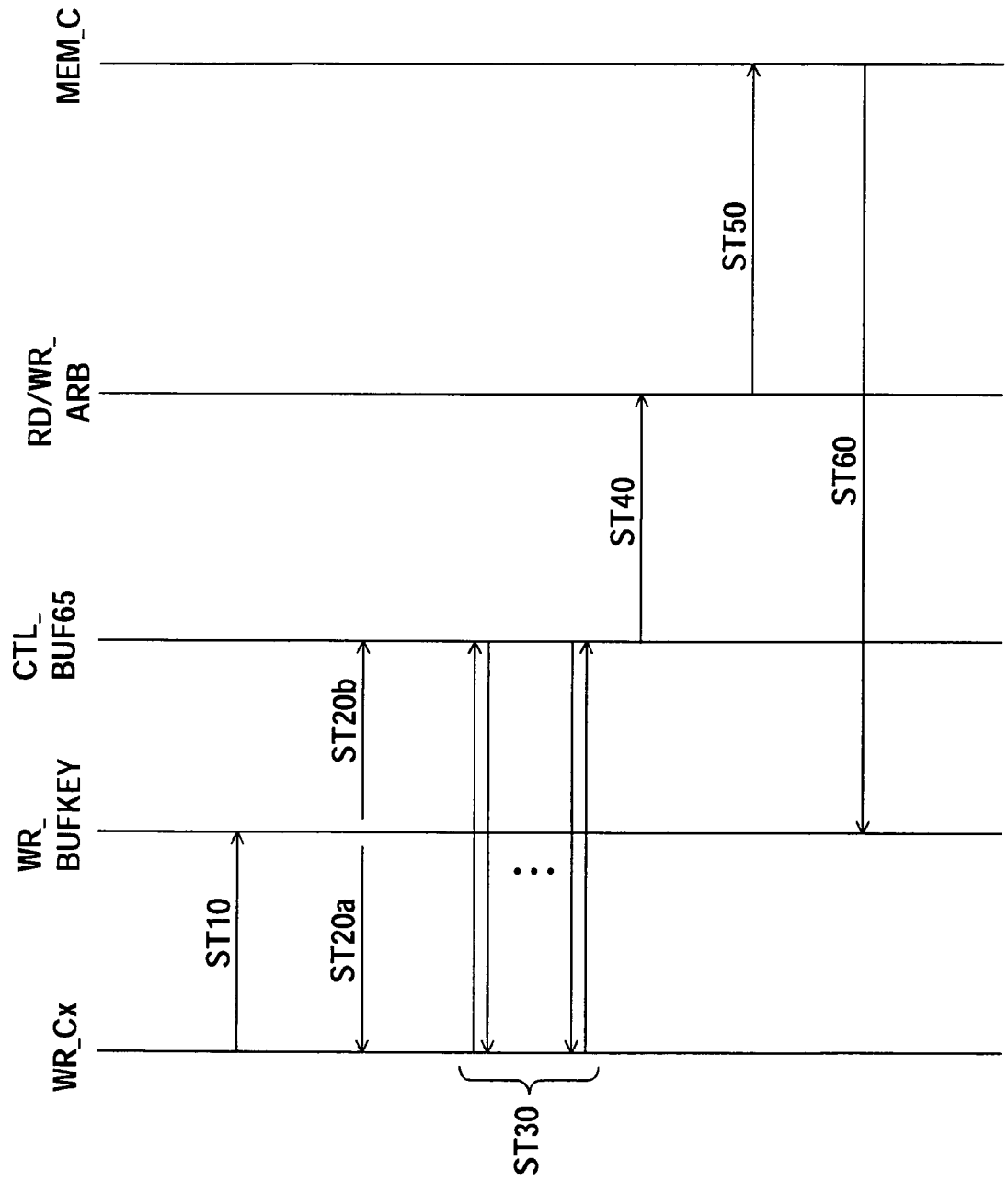
FIG. 28 is an operation flow of write processing of an arbiter related to an embodiment.

First, in a step ST10 of FIG. 28, each bus master WR_Cx sends the request signal Cx_REQ and the request time WR_Cx_TIM for the read use buffer key arbitration circuit (WR_BUFKEY) 62 and requests the data transfer for writing.

Further, each bus master WR_Cx supplies the address information (ADR) and the information of number of the data (NUM) to a selection circuit 623.

Next, the write use buffer key arbitration circuit 62 performs the arbitration based on the request time WR_Cx_TIM by the time arbitration circuit 621 and selects a bus master needing the data transfer the most quickly.

Then, the write use buffer key arbitration circuit 62 sends the grant ID (WR_C_GNT_ID) to the selected bus master, at the same time, when there is a vacant area in the write use center buffer 65, the write use buffer key arbitration circuit 62 sends the request signal (WR_KEY_ARB_REQ) and the key (WR_C_KEY) to the bus master (step ST20a).

The selection circuit (sel) 623 selects the address information (WR_ADR) and the information of number of data (WR_NUM) arbitrated by the time arbitration circuit 621 and sends it to the write use center buffer 65 (step ST20b).

When a predetermined amount of data, for example, one word data is accumulated in the FIFO buffer that the bus master has, the bus master performs the data writing request for the write use center buffer 65 based on the key information (WR_KEY_ARB_KEY, WR_KEY_ARB_END).

The write use center buffer 65 arbitrates that data writing request by the data arbitration circuit 651, when the writing grant (WR_C_GNT) is obtained, the bus master writes the data into the data storage area corresponding to the key (step ST30).

When the writing of the data from the bus master is ended, VALID (VAL) corresponding to the key of the write use center buffer 65 is set.

When at least one VALIS is set among VALID corresponding to a plurality of keys, the write use center buffer 65 performs the data transfer request for writing to the read/write arbitration circuit 63 (step ST40).

When the writing request is granted as a result of the arbitration by the read/write arbitration circuit 63, the data transfer is performed from the write use center buffer to the memory controller (MEM_C) (step ST50).

When the writing of the data is all ended, the memory controller (MEM_C) returns the key by BUF_END_KEY and BUF_END to the write use buffer key arbitration circuit 62 (step ST60).

As explained above, according the arbiter according to the present embodiment, since it is configured to have the center buffer shared by all the bus masters and to arbitrate the data transfer request from each bus master with the key corresponding to the data storage area that the center buffer is segmented, when the data transfer request from the bus master fluctuates remarkably in response to the operation mode and so on, it become possible that the center buffer absorbs the fluctuating data transfer operation and each bus master becomes not necessary to estimate the FIFO buffer capacity in the worst case.

Therefore, the FIFO buffer capacity in the entire system is reduced, a chip area can be reduced and the cost can be reduced.

Further, according to the arbiter according to the present embodiment, since it is not necessary to take a large burst length like a DDR_SDRAM, data can be distributed to each bus master for every data of one cycle and the latency is reduced remarkably. As a result, the FIFO buffer capacity of each bus master is expected to be further small and the unnecessary FIFO buffer capacity adjusted to various system modes can be cut.

It should be understood by those skilled in the art that various modifications, combinations, sub-combinations and alterations may occur depending on design requirements and other factors insofar as they are within the scope of the appended claims or the equivalents thereof.

Figure 29:
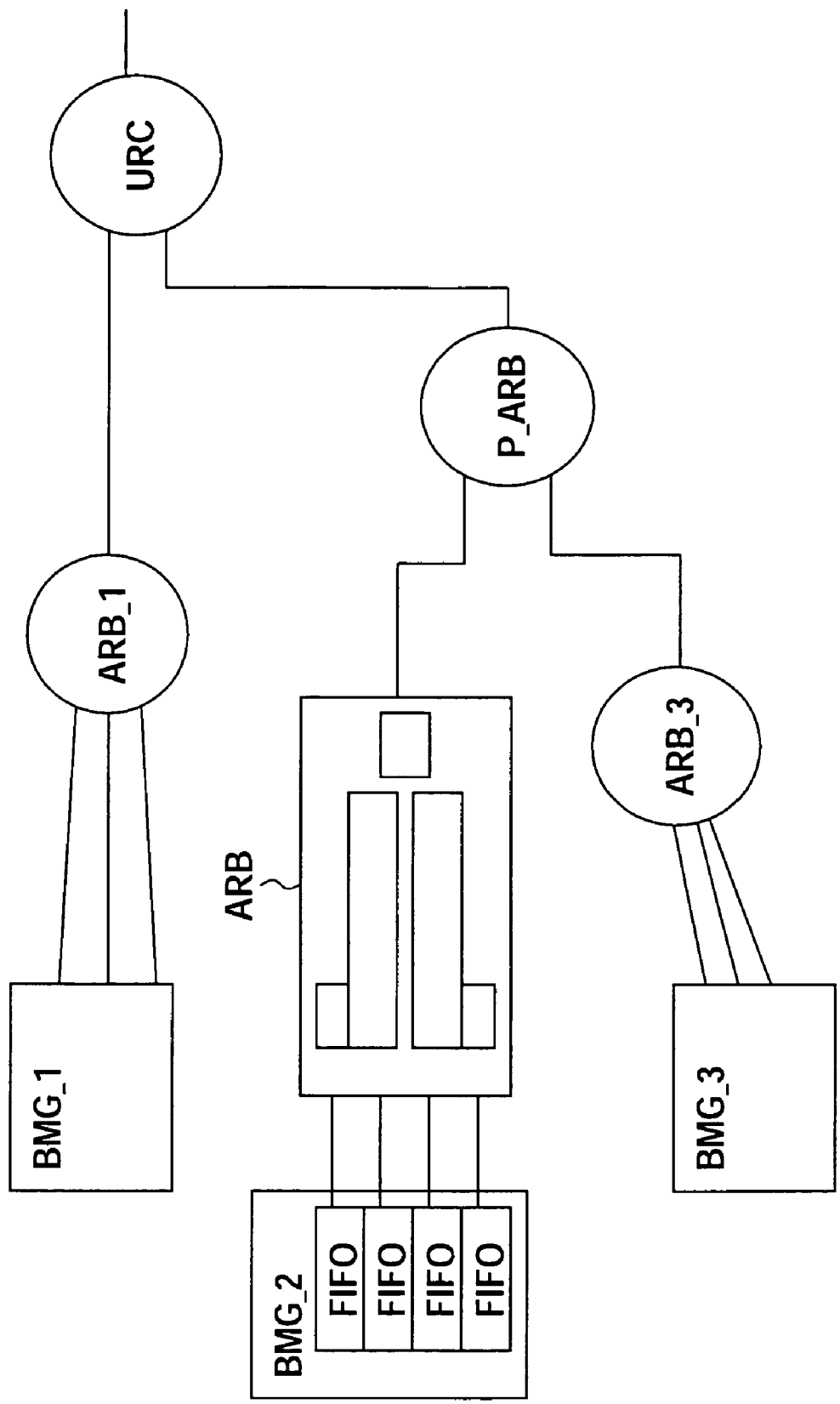
FIG. 29 is a view showing an example of a data processing apparatus related to an embodiment.

For example, the data processing apparatus shown in FIG. 29 is an example that the arbiter (ARB) having the center buffer described in the fifteenth embodiment is applied to, for example, an arbiter for arbitrating the second hierarchy bus master. As a result, the capacity of each second hierarchy bus master can be reduced substantially.

What is claimed is:

1. A bus arbitration apparatus arbitrating data transfer requests for a bus from a plurality of bus masters, comprising:
   a first arbitration unit for arbitrating data transfer requests of a plurality of first bus masters, among the plurality of the bus masters, which request an assurance of delay time from the data transfer request until the data transfer starts;
   a second arbitration unit for arbitrating data transfer requests of a plurality of second bus masters, among the plurality of the bus masters, which perform a data transfer every predictable data transfer period, and
   a third arbitration unit for arbitrating data transfer requests of a plurality of third bus masters, among a plurality of the bus masters, which are not either the first bus masters or the second bus masters,
   wherein arbitrations are performed by the first to the third arbitration unit sequentially.

2. The bus arbitration apparatus as set forth in claim 1, having a control unit for controlling a ratio of a predetermined data processing cycle in which the first arbitration unit uses the bus with priority,
   wherein the arbitrations are performed by the first and the second arbitration units based on the ratio decided by the control unit.

3. The bus arbitration apparatus as set forth in claim 2, wherein the control unit has a counter counting numbers of data transfers to the bus by the first bus masters, and controls the ratio of the cycle in which the first arbitration unit uses the bus in response to a value of the counter.

4. The bus arbitration apparatus as set forth in claim 2, wherein the control unit controls the ratio of the cycle in which the first arbitration unit uses the bus in response to whether or not the sum of numbers of the data transfers necessary for each data transfer event to the bus by the first bus masters exceeds a first predetermined threshold value.

5. The bus arbitration apparatus as set forth in claim 4, wherein the control unit, being given a maximum number of data transfer cycles necessary for a variety of data transfer events, has a second counter counting a maximum numbers of data transfer cycles of each data transfer event by the first bus masters;

compares a count result of the second counter with a predetermined second threshold value; and controls the ratio of the cycles in which the first arbitration unit uses the bus in response to whether or not the count result exceeds the second threshold value.

6. The bus arbitration apparatus as set forth in claim 5, wherein, when a count result in Nth (N: natural number) cycle exceeds the second threshold value, the control unit adds the exceeded number to the count result in N+1th cycle to compare the second threshold value.

7. The bus arbitration apparatus as set forth in claim 2, wherein the first arbitration unit controls a ratio of a predetermined data processing cycle that the bus is used with priority for each bus master in the first bus masters.

8. The bus arbitration apparatus as set forth in claim 1, wherein the bus arbitration apparatus decides one arbitration unit to perform among the first to the third arbitration units in response to delay time to be assured, which is given with a data transfer request.

9. A bus arbitration method arbitrating data transfer requests for a bus from a plurality of bus masters, comprising the steps of arbitrating data transfer requests of a plurality of first bus masters, among a plurality of the bus masters, which request an assurance of delay time from the data transfer request until the data transfer starts;

arbitrating data transfer requests of a plurality of second bus masters, among a plurality of the bus masters, which perform a data transfer every predictable data transfer period; and arbitrating data transfer requests of a plurality of third bus masters, among a plurality of the bus masters, which are not either the first bus masters or the second bus masters.

* * * * *